US012332667B2

(12) United States Patent
Feng et al.

(10) Patent No.: US 12,332,667 B2
(45) Date of Patent: Jun. 17, 2025

(54) UNMANNED AERIAL VEHICLE REMOTE TAKE-OFF AND LANDING METHOD AND SYSTEM, AND TERMINAL

(71) Applicant: AUTEL ROBOTICS CO., LTD., Shenzhen (CN)

(72) Inventors: Yinhua Feng, Guangdong (CN); Jie Leng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/399,120

(22) Filed: Dec. 28, 2023

(65) Prior Publication Data

US 2024/0419193 A1  Dec. 19, 2024

(30) Foreign Application Priority Data

Dec. 30, 2022  (CN) .......................... 202211735422.4

(51) Int. Cl.
*G05D 1/65* (2024.01)
*G05D 1/617* (2024.01)
*G05D 1/652* (2024.01)
*G05D 1/654* (2024.01)
*G05D 1/698* (2024.01)
*G05D 109/20* (2024.01)

(52) U.S. Cl.
CPC .......... *G05D 1/6987* (2024.01); *G05D 1/621* (2024.01); *G05D 1/652* (2024.01); *G05D 1/654* (2024.01); *G05D 2109/20* (2024.01)

(58) Field of Classification Search
CPC ...... G05D 1/6987; G05D 1/621; G05D 1/654; G05D 1/652; G05D 2109/20
See application file for complete search history.

*Primary Examiner* — Mathew Franklin Gordon

(57) ABSTRACT

The present disclosure relates to the technical field of an unmanned aerial vehicle remote take-off and landing method and system, and a terminal. A first route task instruction is sent to a first nest, where the first route task instruction is configured to control the first unmanned aerial vehicle to execute a first route task in a direction of a second nest. Distance information between the first unmanned aerial vehicle and the second nest is obtained in real time, and a vehicle moving instruction is sent to the second nest when the distance information is less than a preset distance, where the vehicle moving instruction is configured to controlling a second unmanned aerial vehicle corresponding to the second nest to leave the second nest. A landing instruction is sent to the first unmanned aerial vehicle, to control the first unmanned aerial vehicle to land in the second nest.

20 Claims, 13 Drawing Sheets

UNMANNED AERIAL VEHICLE REMOTE TAKE-OFF AND LANDING METHOD AND SYSTEM, AND TERMINAL

CROSS REFERENCE TO RELATED APPLICATION

This application claims the benefit of and priority to Chinese Patent Application No. 202211735422.4, filed on Dec. 30, 2022, and entitled as "Unmanned aerial vehicle remote take-off and landing method and system, and terminal" the entirety of which is hereby incorporated herein by reference for all purposes.

BACKGROUND

With the continuous development of unmanned aerial vehicle aerial photography technologies, unmanned aerial vehicles have gradually become more and more popular and are widely used in aerial photography, urban management, surveying and mapping, power inspection, agriculture, meteorology and other fields, which further derives product forms such as a consumer unmanned aerial vehicle, an industrial unmanned aerial vehicle and a large and medium-sized cargo unmanned aerial vehicle. The large and medium-sized cargo unmanned aerial vehicle has a long endurance time and can complete a patrol task.

When the patrol task of the unmanned aerial vehicle is planned, in order to make full use of a long-range feature of the unmanned aerial vehicle, it is necessary to schedule the unmanned aerial vehicle to patrol from a current position along a high-voltage line for patrolling, and finally fly to a different place for landing.

Currently, a plurality of ground stations are usually set up for remote take-off and landing of the unmanned aerial vehicle, and interaction between a take-off ground station and a landing ground station is realized through the unmanned aerial vehicle. For example, the landing ground station sends takeover application to the unmanned aerial vehicle, the unmanned aerial vehicle forwards the takeover application to the take-off ground station, and the take-off ground station determines whether to agree to takeover, thereby realizing takeover of the unmanned aerial vehicle by the landing ground station.

However, this method requires the use of the unmanned aerial vehicle as a communication intermediary. The unmanned aerial vehicle is in a moving state and is susceptible to interference from various signals, which may cause poor communication quality and affect normal remote take-off and landing.

SUMMARY

The present disclosure relates to the technical field of unmanned aerial vehicles, and in particular, to an unmanned aerial vehicle remote take-off and landing method and system, and a terminal. Embodiments of the present disclosure provide an unmanned aerial vehicle remote take-off and landing method and system, and a terminal, to resolve a problem that communication quality affects remote take-off and landing of an unmanned aerial vehicle and improve stability of remote take-off and landing of the unmanned aerial vehicle.

In order to resolve the foregoing technical problem, the embodiments of the present disclosure provide the following technical solutions:

According to a first aspect, an embodiment of the present disclosure provides an unmanned aerial vehicle remote take-off and landing method, applied to a terminal, the terminal being communicatively connected to at least two nests, each nest corresponding to an unmanned aerial vehicle, and the method including:

sending a first route task instruction to a first nest, to enable the first nest to forward the first route task instruction to a first unmanned aerial vehicle corresponding to the first nest, where the first route task instruction is used for controlling the first unmanned aerial vehicle to execute a first route task in a direction of a second nest;

obtaining distance information between the first unmanned aerial vehicle and the second nest in real time, and sending a vehicle moving instruction to the second nest if the distance information is less than a preset distance, where the vehicle moving instruction is used for controlling a second unmanned aerial vehicle corresponding to the second nest to leave the second nest; and sending a landing instruction to the first unmanned aerial vehicle, to control the first unmanned aerial vehicle to land in the second nest.

According to a second aspect, an embodiment of the present disclosure provides an unmanned aerial vehicle remote take-off and landing method, including:

sending, by a terminal, a first route task instruction to a first vehicle nest;

forwarding, by the first vehicle nest after receiving the first route task instruction, the first route task instruction to a first unmanned aerial vehicle corresponding to the first vehicle nest, where the first route task instruction is used for controlling the first unmanned aerial vehicle to execute a first route task in a direction of a second vehicle nest;

obtaining, by the terminal, distance information between the first unmanned aerial vehicle and the second vehicle nest in real time, and sending a vehicle moving instruction to the second vehicle nest if the distance information is less than a preset distance;

controlling, by the second vehicle nest after receiving the vehicle moving instruction, a second unmanned aerial vehicle corresponding to the second vehicle nest to leave the second vehicle nest; and sending, by the terminal, a landing instruction to the first unmanned aerial vehicle, to control the first unmanned aerial vehicle to land in the second vehicle nest.

According to a third aspect, an embodiment of the present disclosure provides a terminal, including:

at least one processor; and a memory communicatively connected to the at least one processor, where the memory stores instructions executable by the at least one processor, the instructions, when executed by the at least one processor, enabling the at least one processor to perform the unmanned aerial vehicle remote take-off and landing method in the first aspect.

According to a fourth aspect, an embodiment of the present disclosure provides an unmanned aerial vehicle remote take-off and landing system, used in the unmanned aerial vehicle remote take-off and landing method in the second aspect, the system including:

at least two unmanned aerial vehicles;

at least two vehicle nests; and a terminal, communicatively connected to the at least two vehicle nests.

According to a fifth aspect, an embodiment of the present disclosure provides a computer-readable storage medium. The computer-readable storage medium is configured to store a computer program, where the computer program enables a computer to execute instructions of some or all of steps described in the first aspect or the second aspect.

According to a sixth aspect, an embodiment of the present disclosure provides a computer program product. The computer program product includes a non-transitory computer-readable storage medium storing a computer program, where the computer program is operable to enable a computer to perform some or all steps described in the first aspect or the second aspect. The computer program product may be a software installation package.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present disclosure, the present disclosure is described in further detail below with reference to the accompanying drawings and specific embodiments. It is to be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present disclosure, rather than indicating or implying that the mentioned apparatus or component must have a particular orientation or must be constructed and operated in a particular orientation. Therefore, such terms should not be construed as limiting of the present disclosure. In addition, terms such as "first", "second" and "third" are used only for description purpose and shall not be construed as indicating or implying relative importance.

Unless otherwise defined, meanings of all technical and scientific terms used in this specification are the same as those usually understood by a person skilled in art of the present disclosure. In the present disclosure, terms used in the specification of the present disclosure are merely intended to describe objectives of the specific embodiments, but are not intended to limit the present disclosure. A term "and/or" used in this specification includes any or all combinations of one or more related listed items.

In addition, technical features involved in different embodiments of the present disclosure described below may be combined together if there is no conflict.

The unmanned aerial vehicle remote take-off and landing method in the embodiments of the present disclosure is described in detail with reference to the accompanying drawings.

Figure 1:
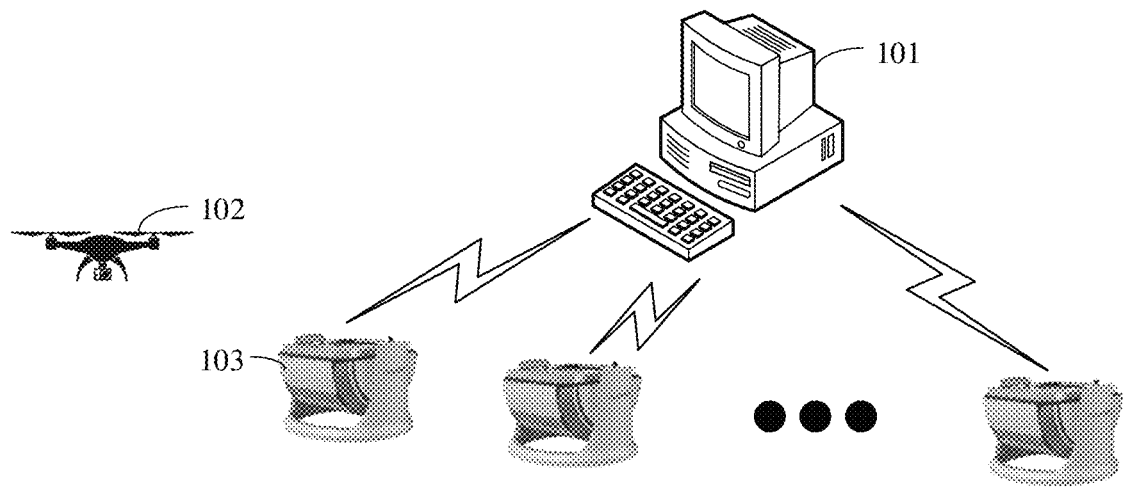
FIG. 1 is a schematic diagram of an disclosure scenario according to an embodiment of the present disclosure.

Refer to FIG. 1. FIG. 1 is a schematic diagram of an disclosure scenario according to an embodiment of the present disclosure.

As shown in FIG. 1, the disclosure scenario includes a terminal 101, an unmanned aerial vehicle 102, a plurality of vehicle nests 103. The terminal 101 is communicatively connected to each vehicle nest 103. For example, the terminal 101 is communicatively connected to each vehicle nest 103 through a wireless network. The vehicle nest 103 is an unmanned aerial vehicle nest that is configured to perform take-off and landing by the unmanned aerial vehicle 102.

It may be understood that the unmanned aerial vehicle in this embodiment of the present disclosure corresponds to a controller, that is, flight control of the unmanned aerial vehicle. A pilot or user can operate the controller to operate the unmanned aerial vehicle 102 through a wireless network. The controller has a capability to monitor and control flight and a task of the unmanned aerial vehicle, and includes a set of devices for controlling launch and recovery of the unmanned aerial vehicle.

In some embodiments, the terminal 101 is an operation center or a command center. The terminal 101 is communicatively connected to each vehicle nest 103 and is configured to control relevant operations of each vehicle nest 103, for example, send a control instruction to the vehicle nest 103 to control the vehicle nest 103 to accommodate the unmanned aerial vehicle 102, or control the vehicle nest 103 to perform battery replacement on the unmanned aerial vehicle 102 or control the vehicle nest 103 to move the unmanned aerial vehicle 102 to the outside.

It may be understood that, the terminal 102 may further include a module such as a display screen. Details are not described herein again.

In some embodiments, the unmanned aerial vehicle 102 comprises: a multi-rotor unmanned aerial vehicle, a fixed-wing unmanned aerial vehicle, an unmanned helicopter, a mixed-wing unmanned aerial vehicle and the like. In some embodiments, the unmanned aerial vehicle 102 may alternatively be an unmanned aerial vehicle driven by any type of power, and includes, but not limited to, a rotary-wing unmanned aerial vehicle, a fixed-wing unmanned aerial vehicle, a para-wing unmanned aerial vehicle, a flapping-wing unmanned aerial vehicle or a helicopter model. In this embodiment of the present disclosure, a fixed-wing unmanned aerial vehicle is given by way of example for description.

Further, the unmanned aerial vehicle 102 may have a corresponding volume or power according to an actual requirement, to provide a load capacity, a flight speed and a flight range that can meet the needs of use. One or more sensors may further be added to the unmanned aerial vehicle 102 to enable the unmanned aerial vehicle 102 to obtain corresponding data.

For example, in some embodiments, the unmanned aerial vehicle 102 includes at least one sensor among an accelerometer, a gyroscope, a magnetometer, a GPS navigator and a vision sensor.

The unmanned aerial vehicle 102 also includes a flight controller, which serves as a control unit of the unmanned aerial vehicle for flight and data transmission and integrates one or more modules to execute corresponding logic control programs.

In this embodiment of the present disclosure, the unmanned aerial vehicle includes an unmanned aerial vehicle control system. The unmanned aerial vehicle control system includes a state unit, a flight controller, an unmanned aerial vehicle power system and an unmanned aerial vehicle sensor.

Specifically, the unmanned aerial vehicle control system includes the state unit, the flight controller and the unmanned aerial vehicle power system. To be specific, the state unit is connected to the flight controller and the unmanned aerial vehicle power system. An input of the state unit is navigation data and a user interaction command, and an output is a control instruction and a corresponding flag bit. A main function of the state unit is to process the user interaction command and use the navigation data to implement various functions of the unmanned aerial vehicle, such as flight mode switching, status monitoring, waypoint flight, returning and other upper-level functions. The user interaction command is an interactive command issued by a ground user, such as remote control stick measurement data and a key control command. The present disclosure can be implemented in the state unit. Specifically, the control command and the corresponding flag bit outputted by the state unit include a position command, a speed command, an acceleration command, an altitude command, a climb rate command, a climb acceleration command, an attitude angle command, a heading angle rate command, an attitude mode flag bit and a position mode flag bit.

Specifically, the flight controller is connected to the state unit, and is configured to receive the control command and the corresponding flag bit sent by the state unit, receive the navigation data sent by the unmanned aerial vehicle power system and output a motor speed control command. The flight controller includes two flight modes, namely, a position mode and an attitude mode. A main function of the flight controller is to calculate the motor speed command by using the control command and the navigation data through an algorithm, to enable the unmanned aerial vehicle to achieve position and attitude control, that is, enable the position and attitude of the unmanned aerial vehicle to achieve a desired state. Specifically, a battery speed control command, taking a common rotary-wing unmanned aerial vehicle as an example, the data is pulse width modulation (PWM) that controls a motor.

Specifically, the unmanned aerial vehicle power system is connected to the flight controller. The unmanned aerial vehicle power system includes an execution system and a status monitoring system of the unmanned aerial vehicle, and is configured to receive the motor speed control command sent by the flight controller to achieve a corresponding rotating speed, thereby achieving a corresponding attitude angle and position, processing sensor data and indirectly or directly calculating navigation data. Specifically, the unmanned aerial vehicle power system processes data of the unmanned aerial vehicle sensor by using a fusion algorithm to obtain the navigation data. For example, the unmanned aerial vehicle power system includes a GPS, a gyroscope, an accelerometer and a magnetometer. The position, the speed and acceleration data of the unmanned aerial vehicle may be calculated through the GPS, the gyroscope, the accelerometer and the magnetometer. The position, the speed and the acceleration data of the unmanned aerial vehicle may be calculated through binocular vision, the gyroscope, the accelerometer and the magnetometer. The attitude angle and an attitude angular rate of the unmanned aerial vehicle may be calculated through the gyroscope, the accelerometer and the magnetometer.

In some embodiments, the controller of the unmanned aerial vehicle 102 comprises a smart terminal. The smart terminal may be any type of smart device configured to establish a communication connection to the unmanned aerial vehicle 102, for example, a mobile phone, a tablet computer, a smart remote control or another mobile terminal. The controller may further include one or more different user interaction apparatuses, to acquire a user instruction or present and feed back information to the user. Alternatively, the controller includes a terminal device, where the terminal device includes a computer device, a PC end and other devices that establish communication connections with the unmanned aerial vehicle. The terminal device may include one or more different user interaction devices to obtain a user instruction or present or feed back information to the user.

The user interaction devices include but are not limited to: buttons, mice, keyboards, display screens, touch screens, speakers, remote control joysticks and other devices. For example, the controller may include a touch display screen. A user's remote control instruction for the unmanned aerial vehicle is received through the touch display screen and map information, that is, a map picture and image information, that is, an image transmission picture obtained through aerial photography are displayed to the user through the touch display screen. The user may also remotely control the touch screen to switch the image information currently displayed on the display screen. The user may also control movement of the unmanned aerial vehicle through mouse operations or keyboard key operations, or control a direction of a gimbal of the unmanned aerial vehicle, a focal length of a gimbal camera of the unmanned aerial vehicle and the like.

In some embodiments, the existing image visual processing technology may further be fused between the unmanned aerial vehicle and the controller to further provide more intelligent services. For example, the unmanned aerial vehicle may acquire images through a dual-light camera, and the controller analyzes the images, so as to implement gesture control for the unmanned aerial vehicle by the user.

In some embodiments, there are a plurality of vehicle nests 103. Each vehicle nest 103 is configured to dock an unmanned aerial vehicle 102, for example, land an unmanned aerial vehicle in the vehicle nest 103 to perform an operation such as battery replacement on the unmanned aerial vehicle 102.

In some embodiments, the wireless network may be a wireless communication network configured to establish a data transmission channel between two nodes based on any type of data transmission principle, for example, a Bluetooth network, a Wi-Fi network, a wireless cellular network, or a combination thereof located in different signal frequency bands.

The following describes the technical solutions in the present disclosure with reference to the accompanying drawings.

Figure 2:
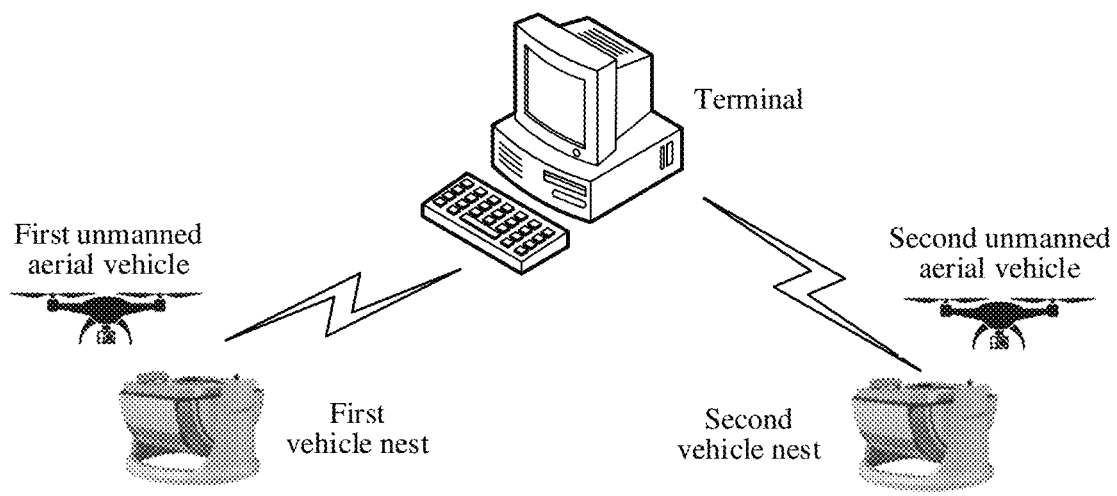
FIG. 2 is a schematic diagram of an disclosure scenario according to Embodiment 1 of the present disclosure.

Refer to FIG. 2. FIG. 2 is a schematic diagram of an disclosure scenario according to the present disclosure.

The disclosure scenario is a scenario in which an unmanned aerial vehicle performs remote take-off and landing. A landing point of the unmanned aerial vehicle is a vehicle nest.

As shown in FIG. 2, the disclosure scenario includes a terminal, a first vehicle nest, a second vehicle nest, a first unmanned aerial vehicle and a second unmanned aerial vehicle. Both the first vehicle nest and the second vehicle nest are communicatively connected to the terminal. The first unmanned aerial vehicle is communicatively connected to the first vehicle nest. The second unmanned aerial vehicle is communicatively connected to the second vehicle nest.

Figure 3:
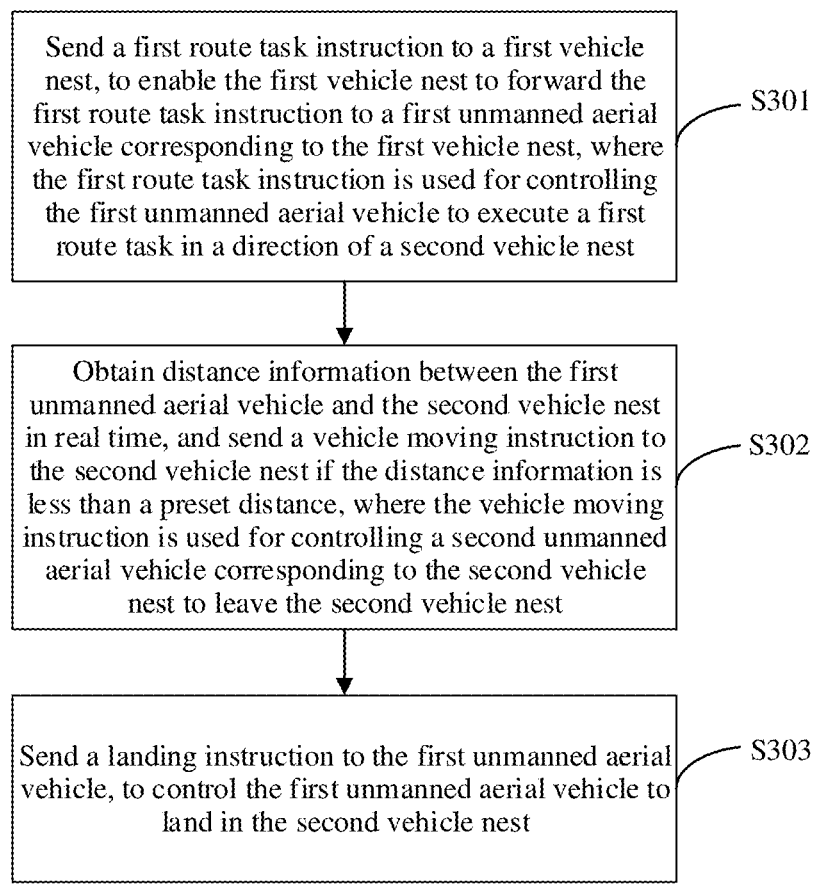
FIG. 3 is a schematic flowchart of an unmanned aerial vehicle remote take-off and landing method according to an embodiment of the present disclosure.

Refer to FIG. 3, FIG. 3 is a schematic flowchart of an unmanned aerial vehicle remote take-off and landing method according to an embodiment of the present disclosure.

The unmanned aerial vehicle remote take-off and landing method is applied to the terminal. Specifically, an execution entity of the unmanned aerial vehicle remote take-off and landing method is one or at least processors of the terminal.

As shown in FIG. 3, the unmanned aerial vehicle remote take-off and landing method includes:

Step S301: Send a first route task instruction to a first vehicle nest, to enable the first vehicle nest to forward the first route task instruction to a first unmanned aerial vehicle corresponding to the first vehicle nest, where the first route task instruction is configured to control the first unmanned aerial vehicle to execute a first route task in a direction of a second vehicle nest.

Specifically, the terminal is communicatively connected to the first vehicle nest and the second vehicle nest based on a preset communication protocol, for example, a TCP communication protocol, a UDP communication protocol and a Netty communication protocol, where the first vehicle nest and the second vehicle nest each correspond to one unmanned aerial vehicle, the first vehicle nest corresponds to the first unmanned aerial vehicle and the second vehicle nest corresponds to the second unmanned aerial vehicle, that is, the first unmanned aerial vehicle parks in the first vehicle nest and the second unmanned aerial vehicle parks in the second vehicle nest.

When the user is to control the first unmanned aerial vehicle to perform the first route task, the first route task instruction is sent to the first nest through the terminal. The terminal sends the first route task instruction to the first nest, to enable the first nest to load the first route task instruction. After receiving the first route task instruction, the first nest forwards the first route task instruction to the first unmanned aerial vehicle parking in the first nest, where the first route task instruction is used for controlling the first unmanned aerial vehicle to execute the first route task in the direction of the second nest.

Step S302: Obtain distance information between the first unmanned aerial vehicle and the second nest in real time, and send a vehicle moving instruction to the second nest if the distance information is less than a preset distance, where the vehicle moving instruction is used for controlling a second unmanned aerial vehicle corresponding to the second nest to leave the second nest.

Specifically, after receiving the first route task instruction, the first unmanned aerial vehicle takes off from the first nest and flies in a direction towards the second nest to execute the first route task.

During flight of the first unmanned aerial vehicle, the terminal obtains a position of the first unmanned aerial vehicle in real time. For example, position information sent by the first unmanned aerial vehicle is obtained in real time through a communication connection to the first unmanned aerial vehicle, or the position of the first unmanned aerial vehicle is obtained through a communication module on the first unmanned aerial vehicle, where the communication module includes a GPS module.

The position of the first unmanned aerial vehicle is obtained in real time, and distance information between the first unmanned aerial vehicle and the second nest is calculated in real time. When it is detected that the distance information between the first unmanned aerial vehicle and the second nest is less than a preset distance, the terminal sends a vehicle moving instruction to the second nest, to enable a second unmanned aerial vehicle in the second nest to leave the second nest, so that the second nest can wait for the first unmanned aerial vehicle to come.

In this embodiment of the present disclosure, the preset distance may be set according to a specific requirement. For example, the preset distance may be set to 10 kilometers, 20 kilometers or the like. This is not limited herein.

After the terminal sends the vehicle moving instruction to the second nest, the second nest opens a cabin door, pushes the second unmanned aerial vehicle and releases a centering rod. In addition, the second nest sends the vehicle moving instruction to the second unmanned aerial vehicle, to enable the second unmanned aerial vehicle to fly out of the second nest and park at an alternate landing point of the second nest, to wait for the first unmanned aerial vehicle to arrive at the second nest.

Step S303: Send a landing instruction to the first unmanned aerial vehicle, to control the first unmanned aerial vehicle to land in the second nest.

Specifically, when the first unmanned aerial vehicle flies near the second nest, the terminal sends a landing instruction to the first unmanned aerial vehicle, to enable the first unmanned aerial vehicle to land in the second nest after receiving the landing instruction.

In this embodiment of the present disclosure, the first nest and the second nest are arranged, the terminal sends the first route task instruction to the first nest and the first nest forwards the first route task instruction to the first unmanned aerial vehicle, to control remote take-off and landing of the first unmanned aerial vehicle. The present disclosure can better achieve remote take-off and landing of an unmanned aerial vehicle.

In this embodiment of the present disclosure, the method further includes: determining, before sending the first route task instruction to the first nest, whether the second nest meets a landing condition, where the landing condition includes that the second nest normally works, the second nest meets a battery replacement condition and weather of a landing point of the second nest meets a task execution condition;

sending the first route task instruction to the first nest if the second nest meets the landing condition; and skipping sending the first route task instruction to the first nest if the second nest does not meet the landing condition, to cancel the first route task.

Specifically, referring to FIG. 4 again, FIG. 4 is a schematic flowchart of an overall procedure of remote take-off and landing according to an embodiment of the present disclosure.

Figure 4:
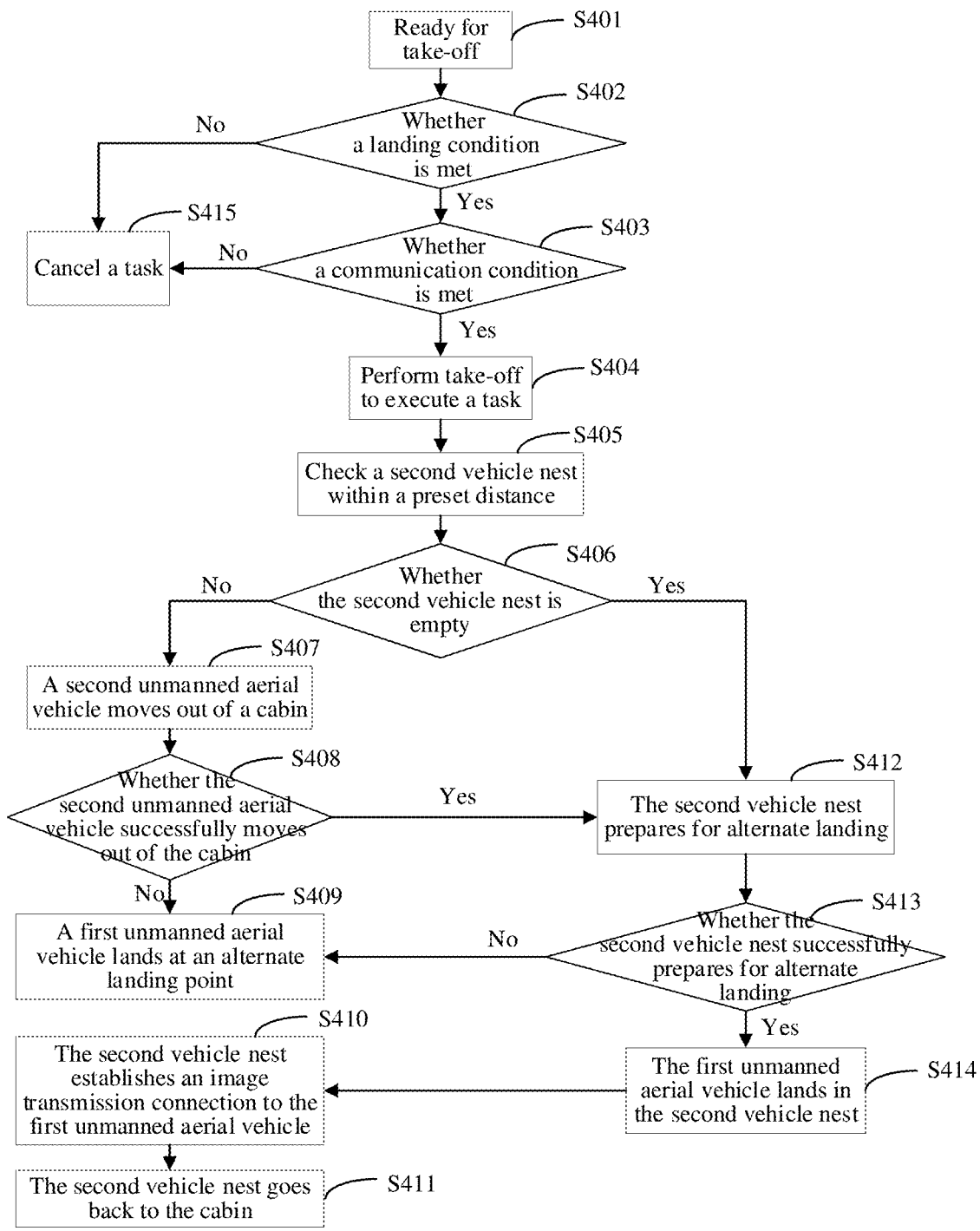
FIG. 4 is a schematic diagram of an overall procedure of remote take-off and landing according to an embodiment of the present disclosure.

As shown in FIG. 4, the overall procedure of remote take-off and landing includes:

Step S401: Ready for take-off.

Specifically, after receiving the first route task instruction, the first unmanned aerial vehicle prepares to take off from the first nest to the second nest. The first route task instruction corresponds to a first route task, and the first route task includes a waypoint task, a channel patrol task and the like. It may be understood that, the waypoint task and the channel patrol task correspond to different task types and different route templates.

Step S402: Whether a landing condition is met.

Specifically, whether the second nest meets the landing condition is determined. If the second nest meets the landing condition, step S403 is performed. If the second nest does not meet the landing condition, step S415 is performed.

Figure 5:
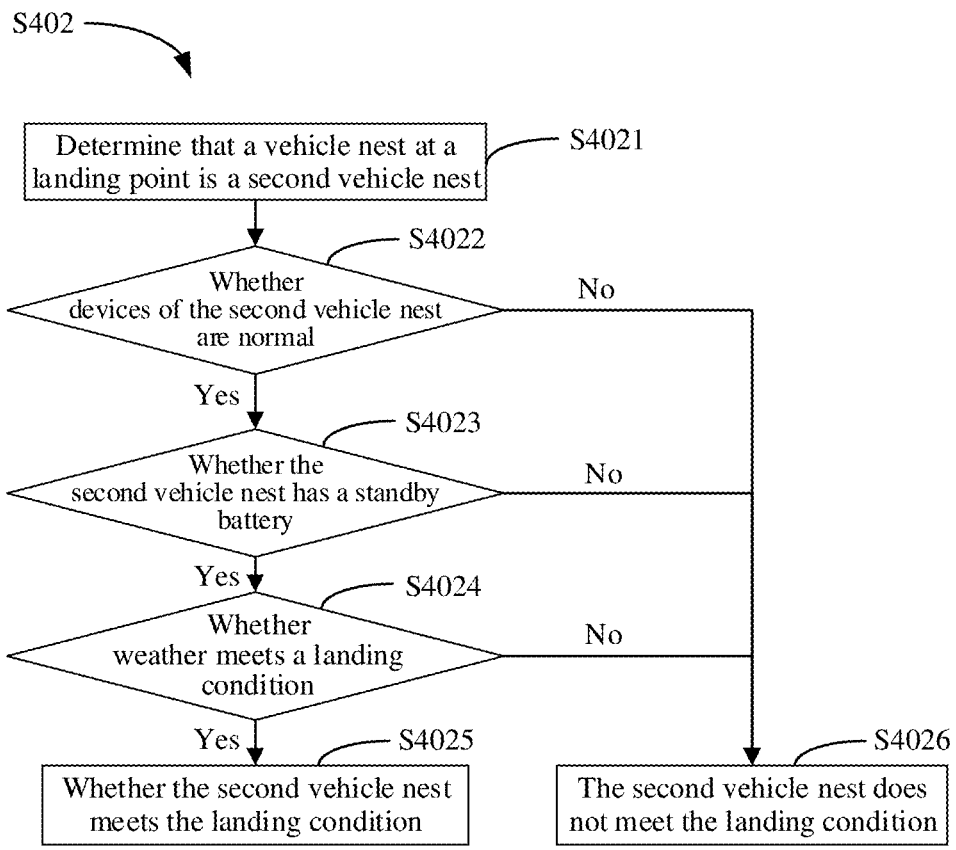
FIG. 5 is a detailed flowchart of step S402 in FIG. 4.

Refer to FIG. 5. FIG. 5 is a detailed flowchart of step S402 in FIG. 4.

As shown in FIG. 5, step S402 includes:

Step S4021: Determine that a nest at a landing point is the second nest.

Specifically, if the first unmanned aerial vehicle executes the first route task, and a nest corresponding to the first route task is the second nest, it is determined that the nest at the landing point is the second nest.

Step S4022: Whether devices of the second nest are normal.

Specifically, whether devices of the second nest such as a cabin door and a centering rod are normal is determined. If the devices are normal, step S4023 is performed; and if the devices are abnormal, step S4026 is performed.

Step S4023: Whether the second nest has a standby battery.

Specifically, whether the second nest has a standby battery is determined. If the second nest has a standby battery, step S4024 is performed; and if the second nest has no standby battery, step S4026 is performed.

Step S4024: Whether weather meets a landing condition.

Specifically, whether weather meets a landing condition is determined, that is, whether weather of a landing point of the second nest meets a task execution condition is determined, for example, whether severe weather such as heavy rain or typhoon occurs is determined. If severe weather occurs, the landing condition is not met, step S4026 is performed; and if the landing condition is met, step S4025 is performed.

Step S4025: Whether the second nest meets the landing condition.

Step S4026: The second nest does not meet the landing condition.

Step S403: Whether a communication condition is met.

Specifically, after whether the second nest meets the landing condition is determined, whether a relay base station on a first route corresponding to the first route task meets a communication condition is further determined, where the communication condition includes that the relay base station normally works and an endurance time of the relay base station exceeds a preset endurance time threshold.

It may be understood that, a plurality of relay base stations and nests are pre-configured during deployment. Each base station has an own key, and communication is implemented by configuring a same frequency band.

Specifically, normal work of the relay base station includes normal communication, normal signal strength, normal devices and the like. The preset endurance time threshold is set according to a specific requirement, for example, 8 hours, 12 hours, and the like.

The first route task instruction is sent to the first nest if the relay base station on the first route corresponding to the first route task meets the communication condition; and The first route task instruction is not sent to the first nest if the relay base station on the first route corresponding to the first route task does not meet the communication condition, to cancel the first route task.

In this embodiment of the present disclosure, a plurality of nests are arranged on the first route corresponding to the first route task, each nest corresponding to at least one alternate landing point, each alternate landing point being in a one-to-one correspondence with a nest number, and the method further includes:

sending position information of each alternate landing point to the first unmanned aerial vehicle after the first nest forwards the first route task instruction to the first unmanned aerial vehicle corresponding to the first nest, where the alternate landing point is arranged within a preset range of each of the nests.

Figure 6:
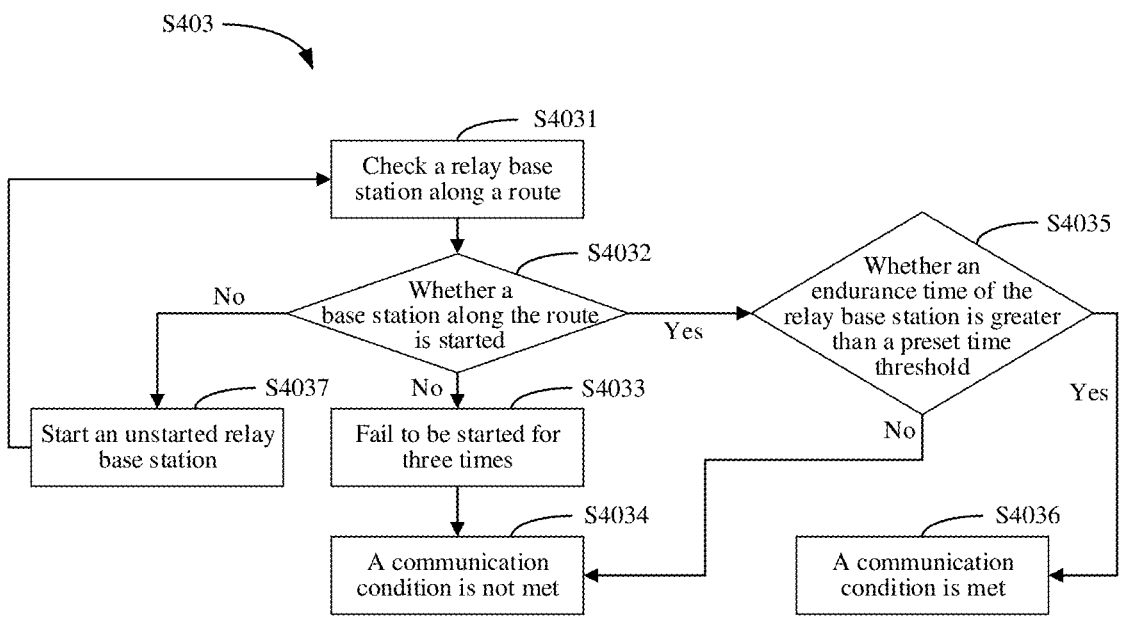
FIG. 6 is a detailed flowchart of step S403 in FIG. 4.

Refer to FIG. 6. FIG. 6 is a detailed flowchart of step S403 in FIG. 4.

As shown in FIG. 6, step S403 includes:

Step S4031: Check a relay base station along a route.

Specifically, the first route corresponding to the first route task corresponds to a plurality of relay base stations. Each relay base station is checked.

Step S4032: Whether a base station along the route is started.

Specifically, whether the relay base station is started is determined. If the relay base station is started, step S4035 is performed; and if the relay base station is not started, step S4037 and step S4033 are performed.

Step S4033: Fail to be started for three times.

Specifically, if a same relay base station continuously fails to be started for three times, it is determined that the communication condition is not met.

Step S4034: The communication condition is not met.

Specifically, it is determined that the relay base station on the first route corresponding to the first route task does not meet the communication condition.

Step S4035: Whether an endurance time of the relay base station is greater than a preset time threshold.

Specifically, the preset time threshold is set according to a specific requirement, for example, 8 hours. If the endurance time of the relay base station is greater than the preset time threshold, step S4036 is performed; and if the endurance time of the relay base station is not greater than the preset time threshold, step S4034 is performed.

Step S4036: The communication condition is met.

Specifically, it is determined that the relay base station on the first route corresponding to the first route task meets the communication condition.

Step S4037: Start an unstarted relay base station.

Specifically, an unstarted relay base station is started if it is detected that the relay base station is not started.

In this embodiment of the present disclosure, the relay base station is charged by solar energy and supported by a 4G card. The relay base station is in a standby and dormant state when not working, and enabling and disabling of the relay base station may be controlled through the terminal. In addition, the relay base station may report state information of a current base station to the terminal in real time.

Step S404: Perform take-off to execute a task.

Specifically, the first unmanned aerial vehicle performs take-off to execute the first route task.

Step S405: Check the second nest within the preset distance.

Specifically, if distance information between the first unmanned aerial vehicle and the second nest is less than the preset distance, the second nest is checked.

Step S406: Whether the second nest is empty.

Specifically, whether a second unmanned aerial vehicle in the second nest moves out of a cabin is determined. In this embodiment of the present disclosure, each nest can accommodate only one unmanned aerial vehicle, that is, whether the second nest is empty is determined. If the second nest is empty, step S412 is performed; and if the second nest is not empty, step S407 is performed.

Step S407: The second unmanned aerial vehicle moves out of the cabin.

Specifically, the second nest is controlled to open a cabin door, to enable the second unmanned aerial vehicle to move out of the cabin.

Step S408: Whether the second unmanned aerial vehicle successfully moves out of the cabin.

Specifically, whether the second unmanned aerial vehicle successfully moves out of the cabin is determined. If the second unmanned aerial vehicle successfully moves out of the cabin, step S412 is performed; and if the second unmanned aerial vehicle unsuccessfully moves out of the cabin, step S409 is performed.

Figure 7:
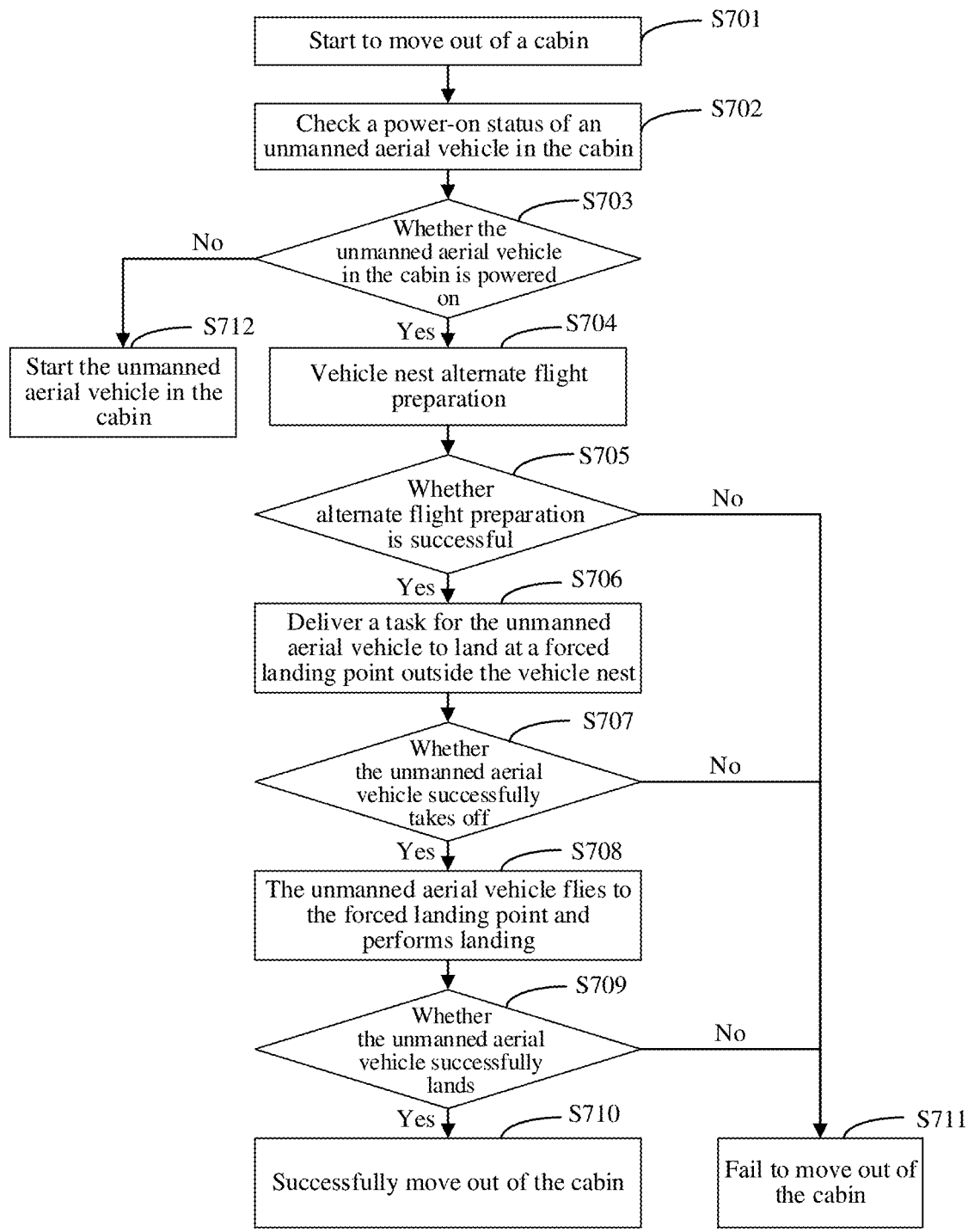
FIG. 7 is a schematic flowchart of moving an unmanned aerial vehicle out of a cabin according to an embodiment of the present disclosure.

Refer to FIG. 7. FIG. 7 is a schematic flowchart of moving an unmanned aerial vehicle out of a cabin according to an embodiment of the present disclosure.

As shown in FIG. 7, a procedure of moving the unmanned aerial vehicle out of the cabin includes:

Step S701: Start to move out of the cabin.

Step S702: Check a power-on status of an unmanned aerial vehicle in the cabin.

Step S703: Whether the unmanned aerial vehicle in the cabin is powered on.

Specifically, whether the unmanned aerial vehicle in the cabin of the nest is powered on is determined. If the unmanned aerial vehicle is powered on, step S704 is performed; and if the unmanned aerial vehicle is not zero, is not powered on, step S712 is performed.

Step S704: The nest performs alternate flight preparation.

Step S705: Whether alternate flight preparation is successful.

Specifically, that whether alternate flight preparation is successful is determined includes:

determining whether the unmanned aerial vehicle is successfully powered on, determining whether a cabin door of the nest is opened, determining whether a parking apron of the nest is pushed and determining whether a centering rod of the nest is released; and if the unmanned aerial vehicle is powered on, the cabin of the nest is opened, the parking apron of the nest is pushed and the centering rod of the nest is released, determining that alternate flight preparation is successful and performing step S706: and if the unmanned aerial vehicle is not powered on, the cabin of the nest is not opened, the parking apron of the nest is not pushed and the centering rod of the nest is not released, determining that alternate flight preparation is unsuccessful and performing step S711.

Step S706: Deliver a task for the unmanned aerial vehicle to land at a forced landing point outside the nest.

Step S707: Whether the unmanned aerial vehicle successfully takes off.

Specifically, whether the unmanned aerial vehicle successfully takes off is determined. If the unmanned aerial vehicle successfully takes off, step S708 is performed; and if the unmanned aerial vehicle unsuccessfully takes off, step S711 is performed.

Step S708: The unmanned aerial vehicle flies to the forced landing point and performs landing.

It may be understood that, the forced landing point is a landing point that is preset or temporarily set during flight, where the landing point is a take-off position of the nest, that is, a position on the parking apron.

Step S709: Whether the unmanned aerial vehicle successfully lands.

Specifically, whether the unmanned aerial vehicle lands at the forced landing point is determined. If the unmanned aerial vehicle lands at the forced landing point, step S710 is performed; and if the unmanned aerial vehicle does not land at the forced landing point, step S711 is performed.

Step S710: Successfully move out of the cabin.

Step S711: Fail to move out of the cabin.

Step S712: Start the unmanned aerial vehicle in the cabin.

Specifically, if the unmanned aerial vehicle is not powered on, the unmanned aerial vehicle in the cabin is started.

Step S409: The first unmanned aerial vehicle lands at an alternate landing point.

Figure 8:
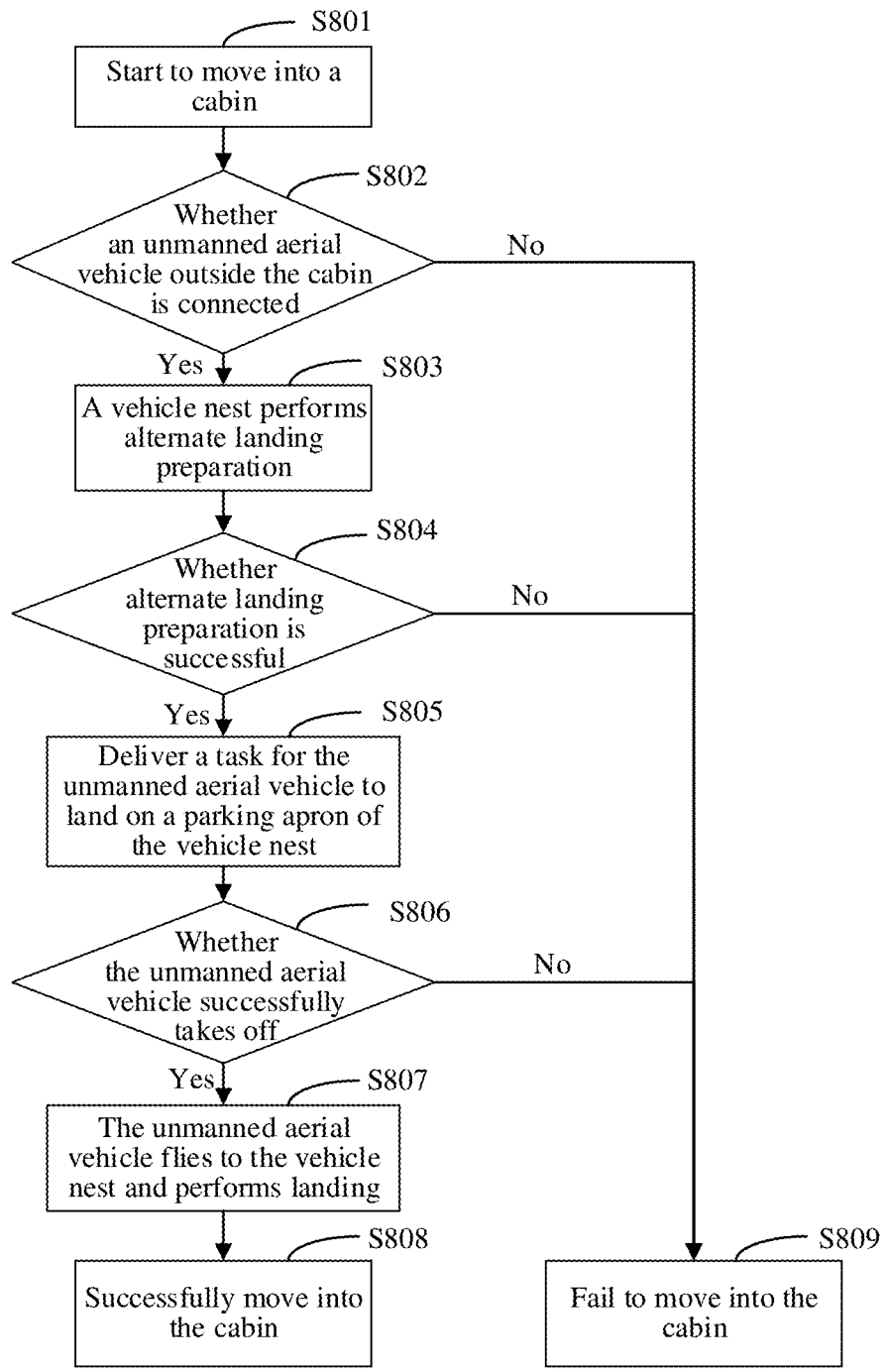
FIG. 8 is a schematic flowchart of moving an unmanned aerial vehicle into a cabin according to an embodiment of the present disclosure.

Specifically, the first unmanned aerial vehicle lands in the second nest. Refer to FIG. 8 again. FIG. 8 is a schematic flowchart of moving an unmanned aerial vehicle into a cabin according to an embodiment of the present disclosure.

As shown in FIG. 8, a procedure of moving the unmanned aerial vehicle into the cabin includes:

Step S801: Start to move into the cabin.

Step S802: Whether an unmanned aerial vehicle outside the cabin is connected.

Step S803: The nest performs alternate landing preparation.

Step S804: Whether alternate landing preparation is successful.

Specifically, whether alternate landing preparation is successful is determined. If alternate landing preparation is successful, step S805 is performed; and if alternate landing preparation is unsuccessful, step S809 is performed. The terminal delivers an instruction to the unmanned aerial vehicle, and the unmanned aerial vehicle may execute the instruction. After executing the instruction, the unmanned aerial vehicle returns a message to the terminal, takes off from the parking apron and lands at the alternate landing point. A state of the unmanned aerial vehicle changes from rotating propellers, to taking off, to landing and finally to successfully landing.

Step S805: Deliver a task for the unmanned aerial vehicle to land on the parking apron of the nest.

Step S806: Whether the unmanned aerial vehicle successfully takes off.

Specifically, whether the unmanned aerial vehicle successfully takes off is determined. If the unmanned aerial vehicle successfully takes off, step S807 is performed; and if the unmanned aerial vehicle unsuccessfully takes off, step S809 is performed.

Step S807: The unmanned aerial vehicle flies to the nest and performs landing.

Step S808: Successfully move into the cabin.

Step S809: Fail to move into the cabin.

Step S410: The second nest establishes an image transmission connection to the first unmanned aerial vehicle.

In this embodiment of the present disclosure, a direct connection between each nest and the unmanned aerial vehicle is established through a key, where the key may be modified or switched through the terminal.

Figure 9:
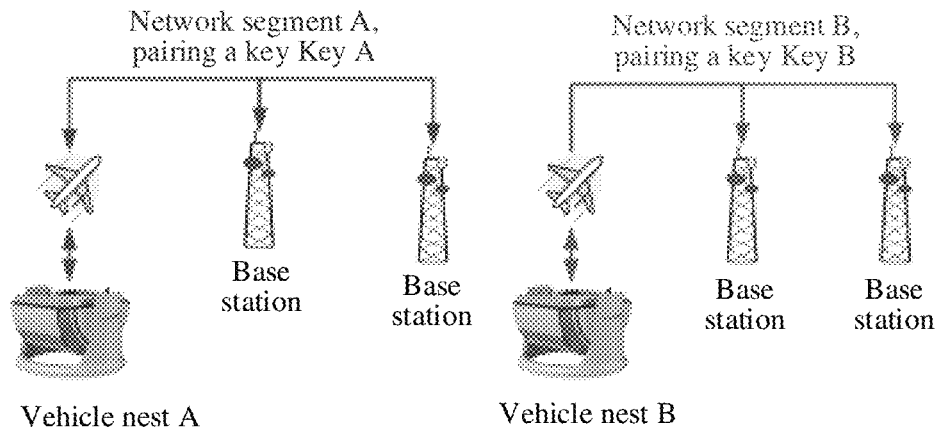
FIG. 9 is a schematic diagram of an image transmission connection between a vehicle nest and an unmanned aerial vehicle according to an embodiment of the present disclosure.

Specifically, referring to FIG. 9, FIG. 9 is a schematic diagram of an image transmission connection between a nest and an unmanned aerial vehicle according to an embodiment of the present disclosure.

As shown in FIG. 9, before the first unmanned aerial vehicle leaves the first nest, the first unmanned aerial vehicle establishes an image transmission connection to the first nest (a nest A). The first nest uses a first network segment (a network segment A), where the first network segment corresponds to a first key (a key Key A), that is, a frequency key is the first key. The second nest (a nest B) uses a second network segment (a network segment B), where the second network segment corresponds to a second Key B, that is, a frequency key is the second key.

It may be understood that, the network segment is a section that uses a same physical layer for direct communication. A same network segment is an address whose network segments are the same. A subnet mask is used for segmenting a network address and a host address of the address. However, conversely, subnet masks of addresses in the same network segment are necessarily the same. An IP address is assigned to each network segment.

When the distance information between the first unmanned aerial vehicle and the second nest is less than the preset distance, the terminal delivers a vehicle moving instruction, to control a second unmanned aerial vehicle corresponding to the second nest to leave the second nest, that is, control the second unmanned aerial vehicle to moves out of the cabin.

Figure 10:
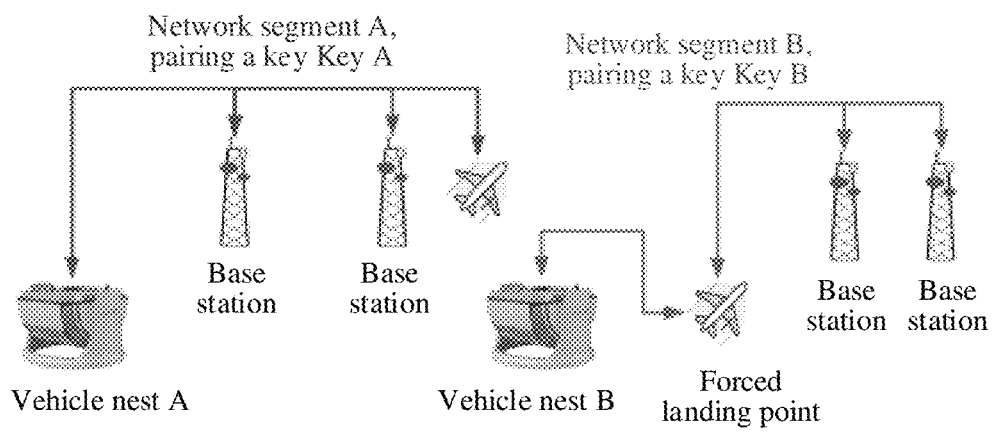
FIG. 10 is a schematic diagram of another image transmission connection between a vehicle nest and an unmanned aerial vehicle according to an embodiment of the present disclosure.

Refer to FIG. 10. FIG. 10 is a schematic diagram of another image transmission connection between a nest and an unmanned aerial vehicle according to an embodiment of the present disclosure.

As shown in FIG. 10, after the vehicle moving instruction is sent to the second nest, the second unmanned aerial vehicle is controlled to fly to an alternate landing point corresponding to the second nest, where the alternate landing point is arranged within a preset range of the second nest;

it is determined that vehicle movement is successful if the second unmanned aerial vehicle lands at the alternate landing point corresponding to the second nest and the first unmanned aerial vehicle lands at a landing point corresponding to the second nest, where the landing point corresponding to the second nest includes a parking apron of the second nest; and it is determined that vehicle movement is unsuccessful if the second unmanned aerial vehicle does not land at the alternate landing point corresponding to the second nest and/or the first unmanned aerial vehicle does not land at the landing point corresponding to the second nest.

Specifically, after the first unmanned aerial vehicle lands in the second nest, a network segment corresponding to the second nest is modified to the first network segment and a key corresponding to the second nest is modified to a key of the first unmanned aerial vehicle, to enable the second nest to establish an image transmission connection to the first unmanned aerial vehicle.

Figure 11:
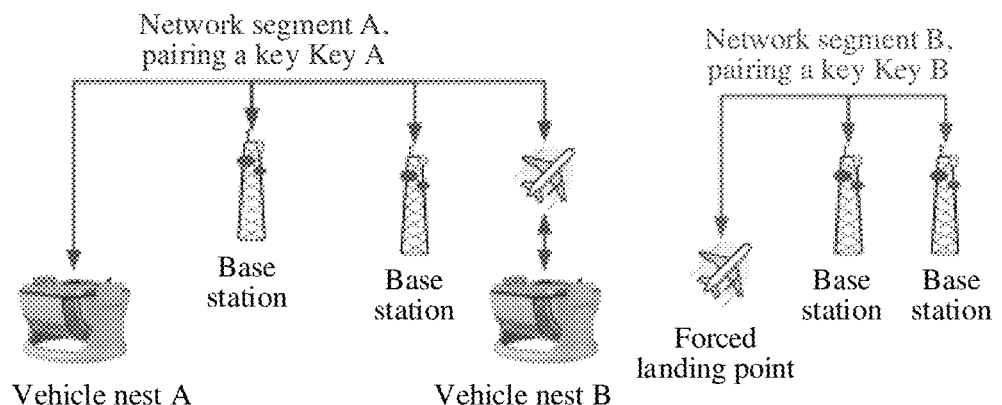
FIG. 11 is a schematic diagram of still another image transmission connection between a vehicle nest and an unmanned aerial vehicle according to an embodiment of the present disclosure.

Refer to FIG. 11. FIG. 11 is a schematic diagram of still another image transmission connection between a nest and an unmanned aerial vehicle according to an embodiment of the present disclosure.

As shown in FIG. 11, after the first unmanned aerial vehicle lands in the second nest (the nest B), the terminal configures that the second nest (nest B) is switched to be at the first network segment (the network segment A), and the frequency key is modified from the second key to the first key (Key A). In this case, the image transmission connection between the first unmanned aerial vehicle and the second nest (the nest B) is established.

It may be understood that, when the second key of the second network segment corresponding to the second nest is modified to the first key of the first network segment, the second nest may establish a communicate connection to the first unmanned aerial vehicle, to enable the second nest to obtain all image transmission and communication data of the first unmanned aerial vehicle.

Step S411: The second nest goes back to the cabin.

Specifically, after the second nest establishes the image transmission connection to the first unmanned aerial vehicle, the second nest is controlled to goes back to the cabin.

Step S412: The second nest prepares for alternate landing.

Specifically, if the second unmanned aerial vehicle successfully moves, the second nest prepares for alternate landing to wait for the first unmanned aerial vehicle to land in the second nest.

Specifically, after the vehicle moving instruction is sent to the second nest, the second unmanned aerial vehicle is controlled to fly to an alternate landing point corresponding to the second nest, where the alternate landing point is arranged within a preset range of the second nest;

it is determined that vehicle movement is successful if the second unmanned aerial vehicle lands at the alternate landing point corresponding to the second nest and the first unmanned aerial vehicle lands at a landing point corresponding to the second nest, where the landing point corresponding to the second nest includes a parking apron of the second nest; and it is determined that vehicle movement is unsuccessful if the second unmanned aerial vehicle does not land at the alternate landing point corresponding to the second nest and/or the first unmanned aerial vehicle does not land at the landing point corresponding to the second nest.

Step S413: Whether the second nest successfully prepares for alternate landing.

Specifically, whether the second nest successfully prepares for alternate landing is determined. If the second nest successfully prepares for alternate landing, step S414 is performed; and if the second nest unsuccessfully prepares for alternate landing, step S409 is performed; landing, by the first unmanned aerial vehicle, at an alternate landing point.

Step S414: The first unmanned aerial vehicle lands in the second nest.

Step S415: Cancel a task.

Specifically, if the second nest does not meet the landing condition or does not meet the communication condition, the task is canceled.

Figure 12:
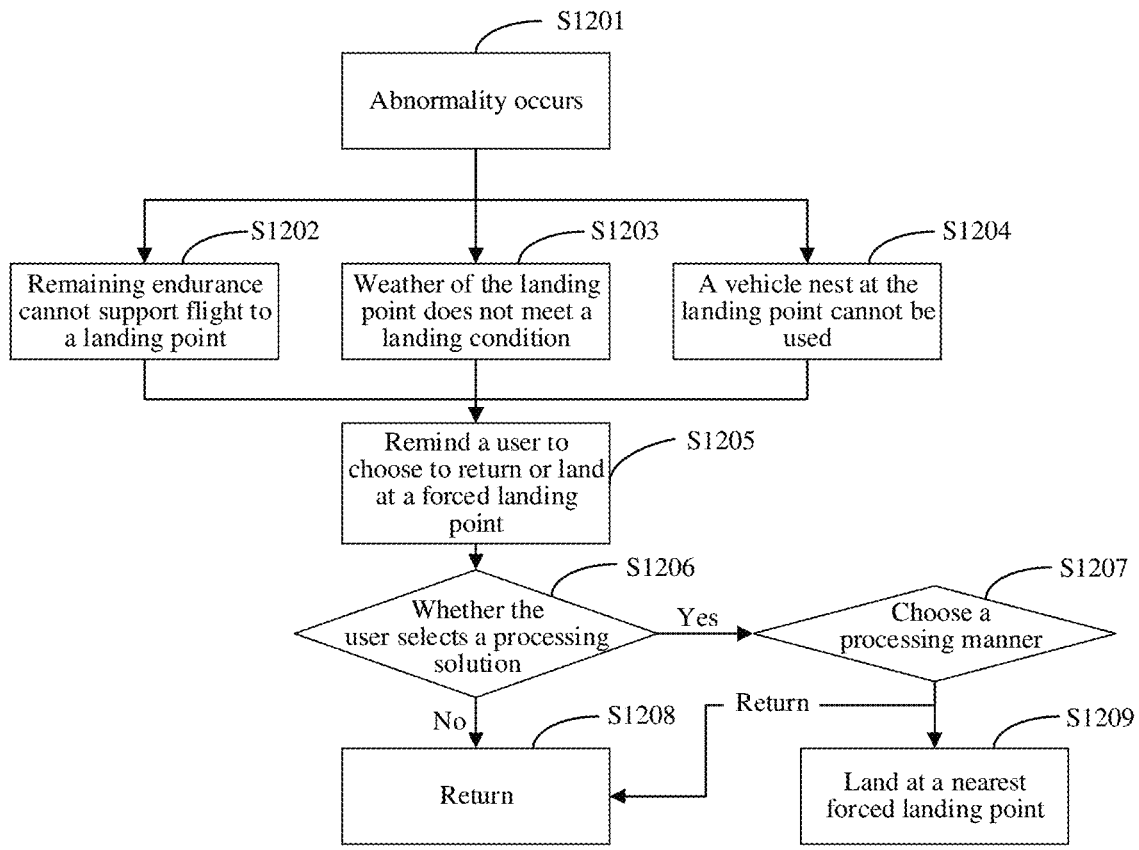
FIG. 12 is a schematic flowchart of abnormality processing according to an embodiment of the present disclosure.

Refer to FIG. 12. FIG. 12 is a schematic flowchart of abnormality processing according to an embodiment of the present disclosure.

As shown in FIG. 12, a procedure of abnormality processing includes: Step S1201: Abnormality occurs.

Specifically, if abnormality occurs on the unmanned aerial vehicle during flight, abnormality processing needs to be performed in this case.

Step S1202: Remaining endurance cannot support flight to a landing point.

Specifically, a remaining endurance time of the unmanned aerial vehicle cannot support the unmanned aerial vehicle in flying to the landing point. In this case, abnormality processing needs to be performed.

Step S1203: Weather of the landing point does not meet a landing condition.

Specifically, if weather of the landing point does not meet a task execution condition, for example, severe weather such as heavy rain or typhoon occurs, it is determined that weather of the landing point does not meet the landing condition.

Step S1204: A nest at the landing point cannot be used.

Step S1205: Remind a user to choose to return or land at a forced landing point.

Step S1206: Whether the user selects a processing solution.

Specifically, whether a control instruction is received is determined, where the control instruction is used for controlling the first unmanned aerial vehicle to perform alternate landing; if the control instruction is received, step S1207 is performed; and if the control instruction is not received, step S1208 is performed.

Step S1207: Choose a processing manner.

Specifically, the processing manner includes returning or landing at a nearest forced landing point. If the control instruction is received, and a processing manner corresponding to the control instruction is returning, step S1208 is performed; and if a processing manner corresponding to the control instruction is landing at the nearest forced landing point, step S1209 is performed.

Step S1208: Return.

Step S1209: Land at a nearest forced landing point.

Specifically, when the first unmanned aerial vehicle is in a task execution state, detecting that the second nest does not meet the landing condition and determining whether a control instruction is received within a preset time;

controlling, if the control instruction is received within the preset time, the first unmanned aerial vehicle to execute the control instruction, where the control instruction is used for controlling the first unmanned aerial vehicle to perform alternate landing; and controlling, if the control instruction is not received within the preset time, the first unmanned aerial vehicle to land at a nearest forced landing point of a current position of the first unmanned aerial vehicle.

It may be understood that, the forced landing point is a landing point of the unmanned aerial vehicle that is preset or temporarily set during flight. If the terminal does not receive the control instruction within the preset time, it is determined that the user does not choose the processing solution. In this case, the first unmanned aerial vehicle is controlled to land at the nearest forced landing point of the current position of the first unmanned aerial vehicle.

It is to be noted that, this embodiment of the present disclosure may further support an disclosure scenario in which there are three or more nests, for example, there are nests a, b and c, and there are unmanned aerial vehicles a1, b1 and c1. The unmanned aerial vehicle a1 in the nest A flies to the nest b, and the unmanned aerial vehicle b1 in the nest b1 performs forced landing. If the task is executed, the unmanned aerial vehicle b1 in the nest b flies to the nest v, and the unmanned aerial vehicle c1 in the nest c performs forced landing or executes a task to another nest, and so on.

In this embodiment of the present disclosure, by using a long-range feature of unmanned aerial vehicles, such as fixed-wing unmanned aerial vehicles, an unmanned aerial vehicle is scheduled to patrol along a first route from a current nest, and finally fly to a nest a different position for landing. In this way, a route task of the unmanned aerial vehicle can be better implemented. Moreover, by setting up a plurality of nests, it is conducive to the unmanned aerial vehicle to perform battery replacement and ensure operational stability of the unmanned aerial vehicle.

In this embodiment of the present disclosure, an unmanned aerial vehicle remote take-off and landing method is provided, applied to a terminal, the terminal being communicatively connected to at least two nests, each nest corresponding to an unmanned aerial vehicle, and the method including: sending a first route task instruction to a first nest, to enable the first nest to forward the first route task instruction to a first unmanned aerial vehicle corresponding to the first nest, where the first route task instruction is used for controlling the first unmanned aerial vehicle to execute a first route task in a direction of a second nest; obtaining distance information between the first unmanned aerial vehicle and the second nest in real time, and sending a vehicle moving instruction to the second nest if the distance information is less than a preset distance, where the vehicle moving instruction is used for controlling a second unmanned aerial vehicle corresponding to the second nest to leave the second nest; and sending a landing instruction to the first unmanned aerial vehicle, to control the first unmanned aerial vehicle to land in the second nest.

The first nest and the second nest are arranged, and the terminal sends an instruction to a nest to control remote take-off and landing of an unmanned aerial vehicle, which can better achieve remote take-off and landing of the unmanned aerial vehicle.

Embodiment 2

Figure 13:
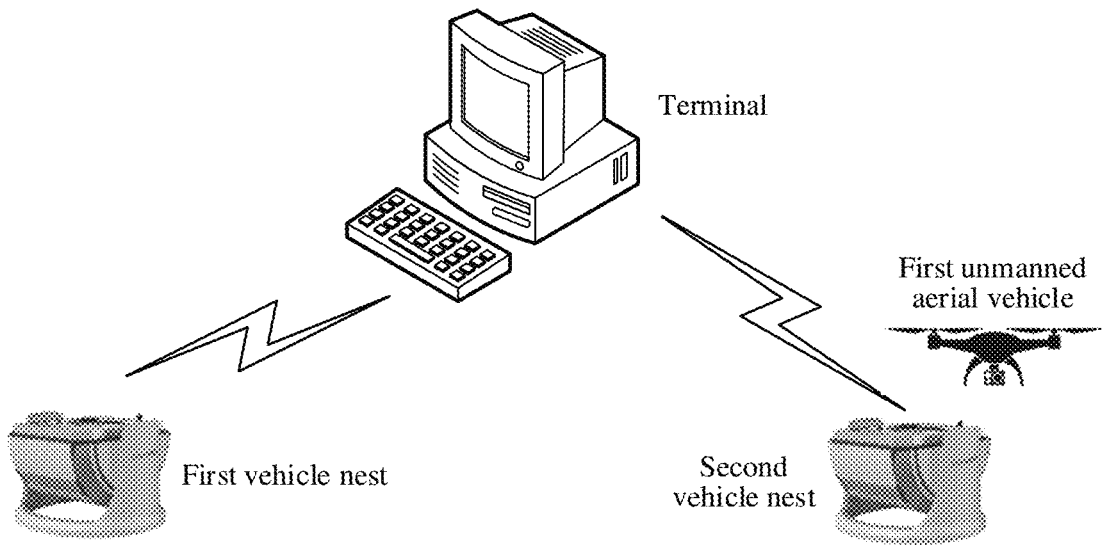
FIG. 13 is a schematic diagram of an disclosure scenario according to Embodiment 2 of the present disclosure.

Refer to FIG. 13. FIG. 13 is a schematic diagram of an disclosure scenario according to Embodiment 2 of the present disclosure.

It is to be noted that, the disclosure scenario in FIG. 13 is similar to the disclosure scenario in FIG. 2. A difference lies in that the first unmanned aerial vehicle in FIG. 13 has landed to the second nest, and in this case, the first unmanned aerial vehicle prepares for returning to the first nest. In other words, the disclosure scenario is an disclosure scenario in which an unmanned aerial vehicle performs remote returning.

It is to be noted that, when the first unmanned aerial vehicle returns from the second nest to the first nest, the processing manner is the same as content in which the first unmanned aerial vehicle flies from the first nest to the second nest, which may be made to content mentioned in Embodiment 1. Details are not described herein again.

In this embodiment of the present disclosure, the method further includes:

sending a second route task instruction to the second nest after the second nest establishes the image transmission connection to the first unmanned aerial vehicle, where the second route task instruction is used for controlling the first unmanned aerial vehicle to execute a second route task in a direction of the first nest;

obtaining battery level information of the first unmanned aerial vehicle after the second nest receives the second route task instruction; and controlling, if the battery level information of the unmanned aerial vehicle is less than a preset battery level threshold, the second nest to replace a battery of the first unmanned aerial vehicle.

Figure 14:
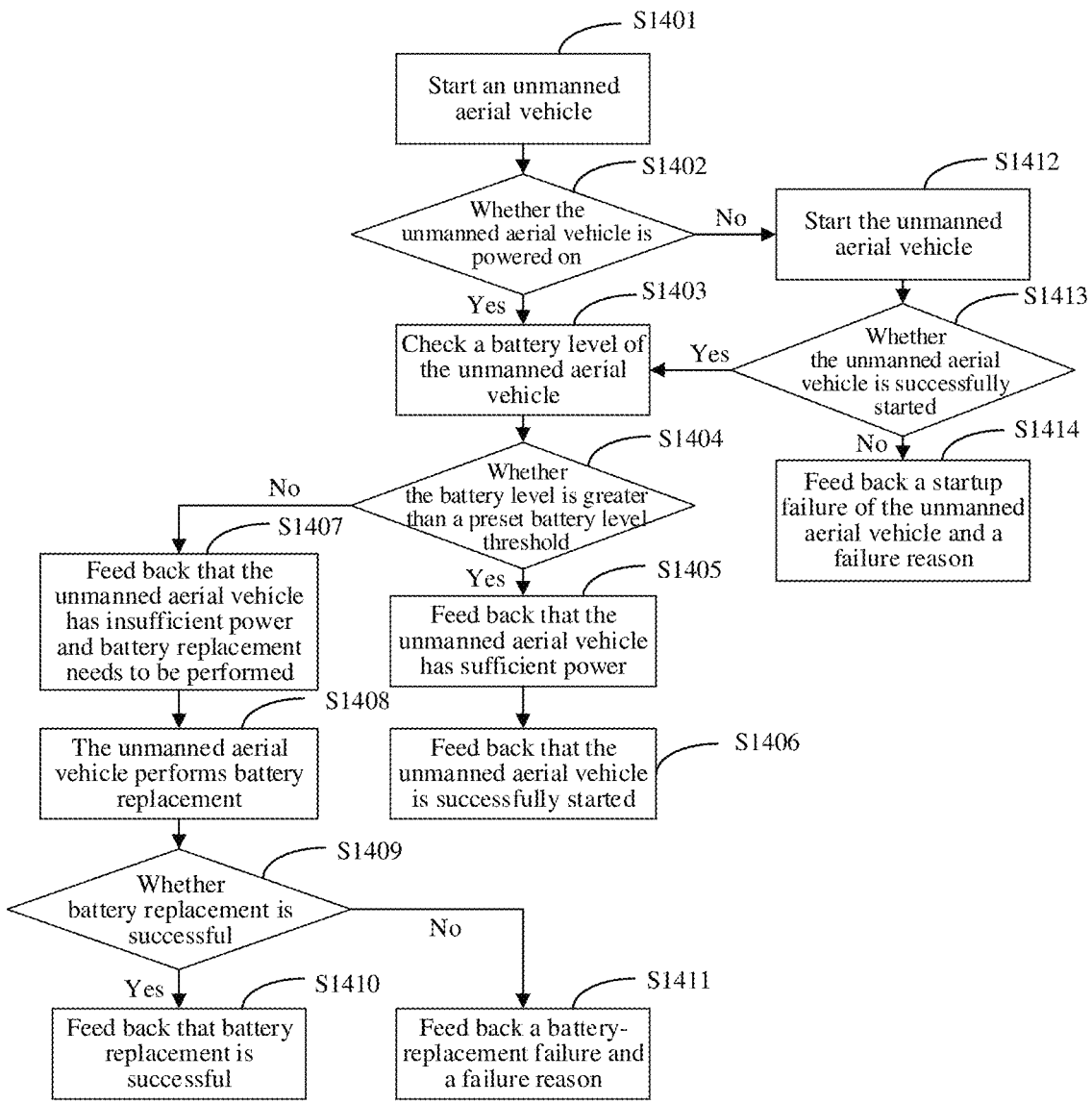
FIG. 14 is a schematic flowchart of performing battery replacement on an unmanned aerial vehicle according to an embodiment of the present disclosure.

Specifically, referring to FIG. 14, FIG. 14 is a schematic flowchart of performing battery replacement on an unmanned aerial vehicle according to an embodiment of the present disclosure.

As shown in FIG. 14, a procedure of performing battery replacement on the unmanned aerial vehicle includes the following steps:

Step S1401: Start the unmanned aerial vehicle.

Step S1402: Whether the unmanned aerial vehicle is powered on.

Specifically, whether the unmanned aerial vehicle is powered on is determined. If the unmanned aerial vehicle is powered on, step S1403 is performed; and if the unmanned aerial vehicle is not powered on, step S1412 is performed; starting the unmanned aerial vehicle.

Step S1403: Check a battery level of the unmanned aerial vehicle.

S1404: Whether the battery level is greater than a preset battery level threshold.

Specifically, whether the battery level of the unmanned aerial vehicle is greater than the preset battery level threshold is determined, where the preset battery level threshold may be set according to a specific requirement, for example, may be set to 80%, 85% or the like of a maximum battery level of the unmanned aerial vehicle.

Step S1405: Feed back that the unmanned aerial vehicle has sufficient power.

Step S1406: Feed back that the unmanned aerial vehicle is successfully started.

Step S1407: Feed back that the unmanned aerial vehicle has insufficient power and needs to perform battery replacement.

Step S1408: The unmanned aerial vehicle performs battery replacement.

Specifically, if battery replacement needs to be performed on the unmanned aerial vehicle, the unmanned aerial vehicle needs to meet a battery replacement condition in this case. The battery replacement condition includes that the unmanned aerial vehicle is located in a nest, a battery level of the unmanned aerial vehicle is less than the preset battery level threshold, a battery compartment in the nest includes at least 2 battery groups and each battery group includes at least one battery.

Step S1409: Whether battery replacement is successful.

Step S1410: Feed back that battery replacement is successful.

In this embodiment of the present disclosure, one-key battery replacement on the unmanned aerial vehicle is implemented through the nest, which can better enable the unmanned aerial vehicle to execute a patrol task.

Step S1411: Feed back a battery-replacement failure and a failure reason.

Specifically, a reason for the battery-replacement failure includes failure of a mechanical arm of the nest, lack of batteries in the nest and the like.

Step S1412: Start the unmanned aerial vehicle.

Step S1413: Whether the unmanned aerial vehicle is successfully started.

Step S1414: Feed back a startup failure of the unmanned aerial vehicle and a failure reason.

It is to be noted that, when the first unmanned aerial vehicle is started from the first nest, a battery level of the first unmanned aerial vehicle may also be detected, to determine whether battery replacement needs to be performed. Details are not described herein again. For details, refer to the content in Embodiment 2 above.

Figure 15:
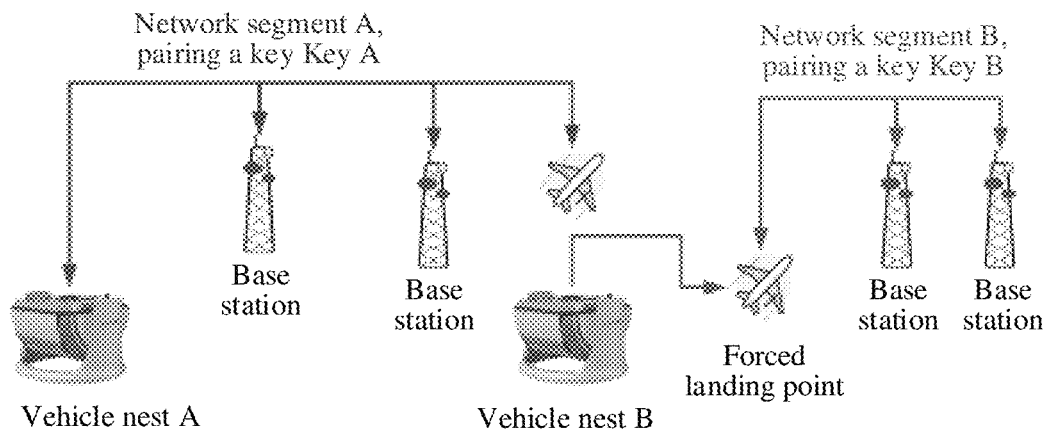
FIG. 15 is a schematic diagram of yet another image transmission connection between a vehicle nest and an unmanned aerial vehicle according to Embodiment 2 of the present disclosure.

Refer to FIG. 15. FIG. 15 is a schematic diagram of yet another image transmission connection between a nest and an unmanned aerial vehicle according to Embodiment 2 of the present disclosure.

As shown in FIG. 15, when the first unmanned aerial vehicle plans to return to the first nest (the nest A), after the first unmanned aerial vehicle moves out of the second nest (the nest B), the terminal configures that the second nest (the nest B) is switched to be at the second network segment (the network segment B), and the frequency key is modified to the second key (the Key B). In this case, the second nest (the nest B) is communicatively connected to the second unmanned aerial vehicle.

Figure 16:
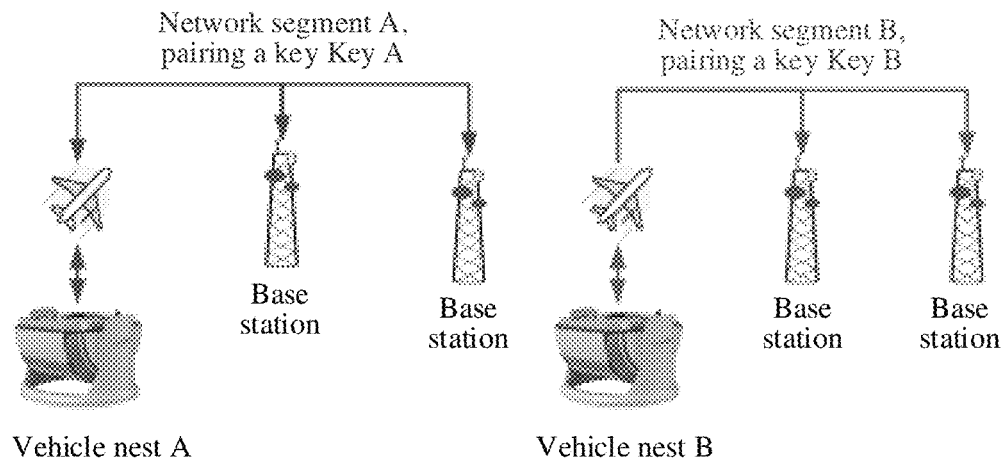
FIG. 16 is a schematic diagram of still yet another image transmission connection between a vehicle nest and an unmanned aerial vehicle according to an embodiment of the present disclosure.

Refer to FIG. 16. FIG. 16 is a schematic diagram of another image transmission connection between a nest and an unmanned aerial vehicle according to an embodiment of the present disclosure.

As shown in FIG. 16, the unmanned aerial vehicle is connected to the first nest (the nest A) through image transmission. After image transmission is successful, the first unmanned aerial vehicle takes off for returning.

In addition, the terminal delivers a vehicle moving instruction to enable the second unmanned aerial vehicle to moves into a cabin from a forced landing point, that is, the second unmanned aerial vehicle enters the second nest. Then, the first unmanned aerial vehicle lands in the first nest and moves into the cabin after the first nest (the nest A) lands.

In this embodiment of the present disclosure, a second route task instruction is sent to the second nest. The second route task instruction is used for controlling the first unmanned aerial vehicle to execute a second route task in a direction of the first nest, to enable the first unmanned aerial vehicle to return to the first nest. The present disclosure can better achieve remote returning.

Embodiment 3

Figure 17:
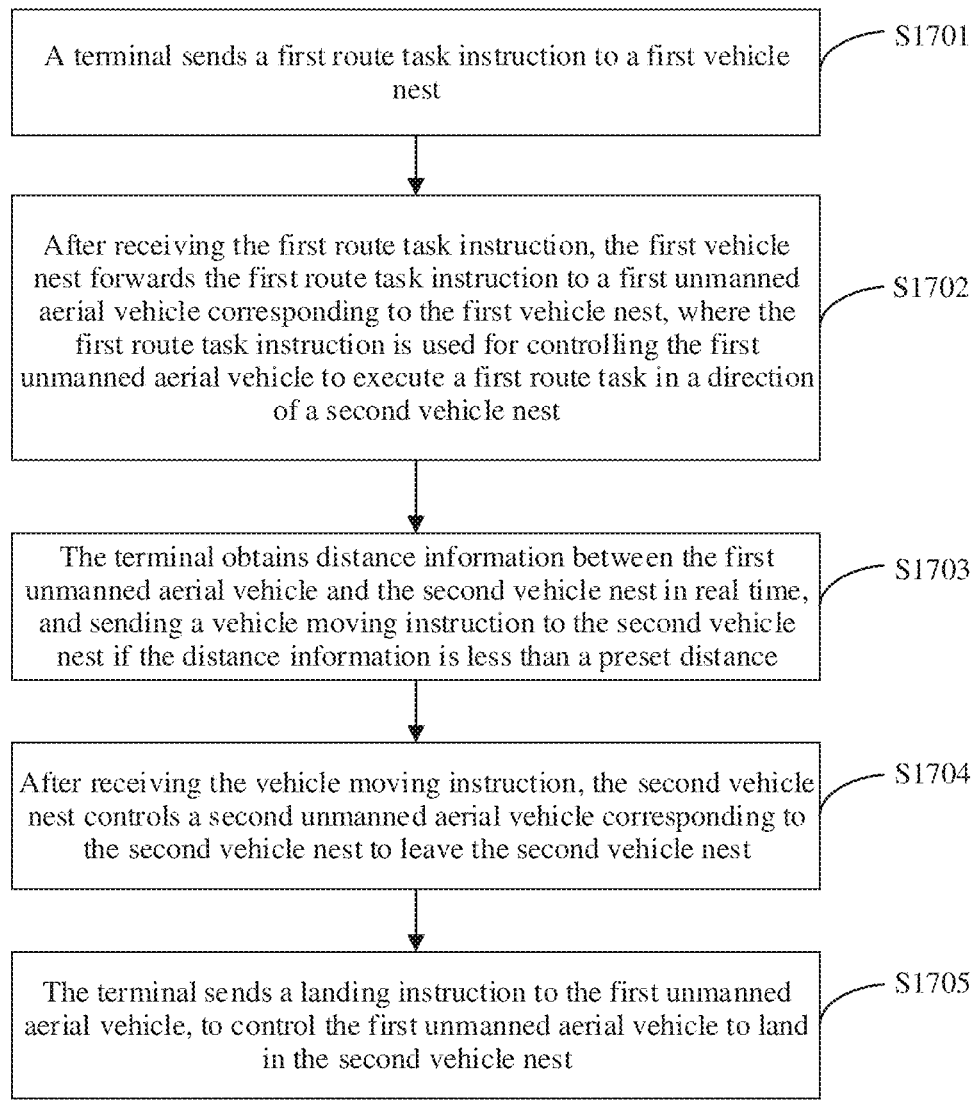
FIG. 17 is a schematic flowchart of an unmanned aerial vehicle remote take-off and landing method according to an embodiment of the present disclosure.

Refer to FIG. 17. FIG. 17 is a schematic flowchart of an unmanned aerial vehicle remote take-off and landing method according to an embodiment of the present disclosure. As shown in FIG. 17, a procedure of the unmanned aerial vehicle remote take-off and landing method includes:

Step S1701: A terminal sends a first route task instruction to a first nest.

Step S1702: After receiving the first route task instruction, the first nest forwards the first route task instruction to a first unmanned aerial vehicle corresponding to the first nest, where the first route task instruction is used for controlling the first unmanned aerial vehicle to execute a first route task in a direction of a second nest.

Step S1703: The terminal obtains distance information between the first unmanned aerial vehicle and the second nest in real time, and sends a vehicle moving instruction to the second nest if the distance information is less than a preset distance.

Step S1704: After receiving the vehicle moving instruction, the second nest controls a second unmanned aerial vehicle corresponding to the second nest to leave the second nest.

Step S1705: The terminal sends a landing instruction to the first unmanned aerial vehicle, to control the first unmanned aerial vehicle to land in the second nest.

Figure 18:
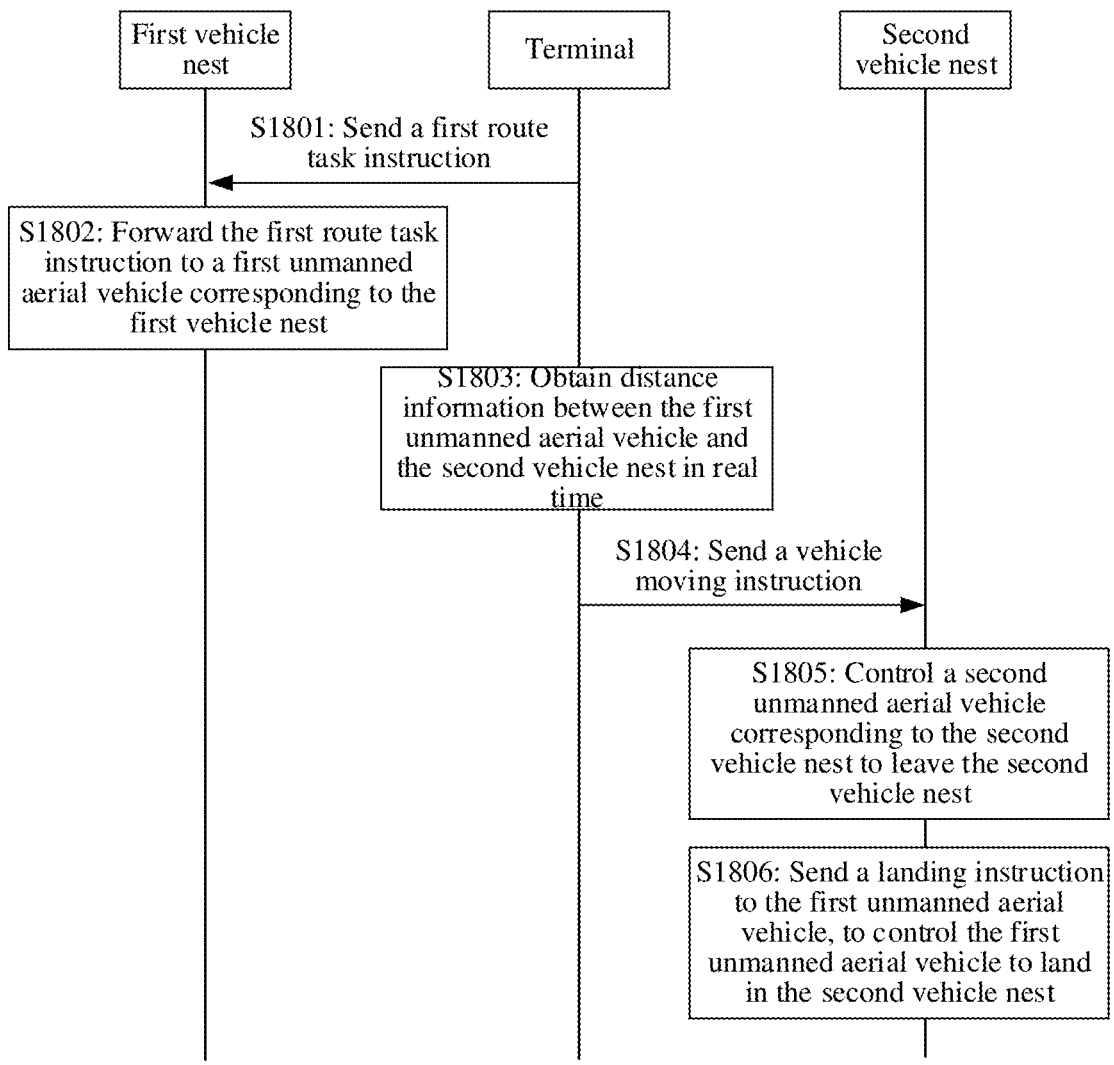
FIG. 18 is an interaction sequence diagram of an unmanned aerial vehicle remote take-off and landing method according to an embodiment of the present disclosure.

Refer to FIG. 18. FIG. 18 is an interaction sequence diagram of an unmanned aerial vehicle remote take-off and landing method according to an embodiment of the present disclosure.

Specifically, an interaction sequence of the unmanned aerial vehicle remote take-off and landing method includes:

Step S1801: A terminal sends a first route task instruction to a first nest.

Step S1802: Forward the first route task instruction to a first unmanned aerial vehicle corresponding to the first nest.

Step S1803: Obtain distance information between the first unmanned aerial vehicle and the second nest in real time.

Step S1804: Send a vehicle moving instruction.

Step S1805: Control a second unmanned aerial vehicle corresponding to the second nest to leave the second nest.

Step S1806: Send a landing instruction to the first unmanned aerial vehicle, to control the first unmanned aerial vehicle to land in the second nest.

It is to be noted that, for related steps of this embodiments of the present disclosure, reference may be made to related content mentioned in Embodiment 1 and Embodiment 2 above. Details are not described herein again.

Alternatively, the method further includes:

determining, before sending the first route task instruction to the first nest, whether the second nest meets a landing condition, where the landing condition includes that the second nest normally works, the second nest meets a battery replacement condition and weather of a landing point of the second nest meets a task execution condition;

sending the first route task instruction to the first nest if the second nest meets the landing condition; and skipping sending the first route task instruction to the first nest if the second nest does not meet the landing condition, to cancel the first route task.

Alternatively, the method further includes:

further determining, after determining whether the second nest meets the landing condition, whether a relay base station on a first route corresponding to the first route task meets a communication condition, where the communication condition includes that the relay base station normally works and an endurance time of the relay base station exceeds a preset endurance time threshold;

sending the first route task instruction to the first nest if the relay base station on the first route corresponding to the first route task meets the communication condition; and skipping sending the first route task instruction to the first nest if the relay base station on the first route corresponding to the first route task does not meet the communication condition, to cancel the first route task.

Alternatively, a plurality of nests are arranged on the first route corresponding to the first route task, each nest corresponding to at least one alternate landing point, each alternate landing point being in a one-to-one correspondence with a nest number, and the method further includes:

sending position information of each alternate landing point to the first unmanned aerial vehicle after the first nest forwards the first route task instruction to the first unmanned aerial vehicle corresponding to the first nest, where the alternate landing point is arranged within a preset range of each of the nests.

Alternatively, the method further includes:

when the first unmanned aerial vehicle is in a task execution state, detecting that the second nest does not meet the landing condition and determining whether a control instruction is received within a preset time;

controlling, if the control instruction is received within the preset time, the first unmanned aerial vehicle to execute the control instruction, where the control instruction is used for controlling the first unmanned aerial vehicle to perform alternate landing; and controlling, if the control instruction is not received within the preset time, the first unmanned aerial vehicle to land at a nearest forced landing point of a current position of the first unmanned aerial vehicle.

Alternatively, the method further includes:

controlling, after sending the vehicle moving instruction to the second nest, the second unmanned aerial vehicle to fly to an alternate landing point corresponding to the second nest, where the alternate landing point is arranged within a preset range of the second nest;

determining that vehicle movement is successful if the second unmanned aerial vehicle lands at the alternate landing point corresponding to the second nest and the first unmanned aerial vehicle lands at a landing point corresponding to the second nest, where the landing point corresponding to the second nest includes a parking apron of the second nest; and determining that vehicle movement is unsuccessful if the second unmanned aerial vehicle does not land at the alternate landing point corresponding to the second nest and/or the first unmanned aerial vehicle does not land at the landing point corresponding to the second nest.

Alternatively, the first nest corresponds to a first network segment, the first network segment corresponding to a first key, and the second nest corresponds to a second network segment, the second network segment corresponding to a second key; and the method further includes:

after the first unmanned aerial vehicle lands in the second nest, a network segment corresponding to the second nest is modified to the first network segment and a key corresponding to the second nest is modified to a key of the first unmanned aerial vehicle, to enable the second nest to establish an image transmission connection to the first unmanned aerial vehicle.

Alternatively, the method further includes:

sending a second route task instruction to the second nest after the second nest establishes the image transmission connection to the first unmanned aerial vehicle, where the second route task instruction is used for controlling the first unmanned aerial vehicle to execute a second route task in a direction of the first nest;

obtaining battery level information of the first unmanned aerial vehicle after the second nest receives the second route task instruction; and controlling, if the battery level information of the unmanned aerial vehicle is less than a preset battery level threshold, the second nest to replace a battery of the first unmanned aerial vehicle.

Alternatively, the method further includes:

sending a first returning instruction to the second nest after the second nest replaces the battery of the first unmanned aerial vehicle, to enable the second nest to forward the first returning instruction to the first unmanned aerial vehicle, where the first returning instruction is used for controlling the first unmanned aerial vehicle to return from the second nest to the first nest.

Alternatively, the method further includes:

determining, before sending the first returning instruction to the second nest, whether the first nest meets a landing condition, where the landing condition includes that the first nest normally works and weather of a landing point of the second nest meets a task execution condition; and if the first nest meets the landing condition, disconnecting the image transmission connection between the second nest and the first unmanned aerial vehicle and establishing an image transmission connection between the first nest and the first unmanned aerial vehicle.

Alternatively, the method further includes:

if the first nest successfully establishes the image transmission connection to the first unmanned aerial vehicle, controlling the second nest to establish an image transmission connection to the second unmanned aerial vehicle and sending the first returning instruction to the second nest, to enable the second nest to forward the first returning instruction to the first unmanned aerial vehicle. In this embodiment of the present disclosure, an unmanned aerial vehicle remote take-off and landing method is provided, including: sending, by a terminal, a first route task instruction to a first nest; forwarding, by the first nest after receiving the first route task instruction, the first route task instruction to a first unmanned aerial vehicle corresponding to the first nest, where the first route task instruction is used for controlling the first unmanned aerial vehicle to execute a first route task in a direction of a second nest; obtaining, by the terminal, distance information between the first unmanned aerial vehicle and the second nest in real time, and sending a vehicle moving instruction to the second nest if the distance information is less than a preset distance; controlling, by the second nest after receiving the vehicle moving instruction, a second unmanned aerial vehicle corresponding to the second nest to leave the second nest; and sending, by the terminal, a landing instruction to the first unmanned aerial vehicle, to control the first unmanned aerial vehicle to land in the second nest. The first nest and the second nest are arranged, and the terminal sends an instruction to a nest to control remote take-off and landing of an unmanned aerial vehicle, which can better achieve remote take-off and landing of the unmanned aerial vehicle.

Figure 19:
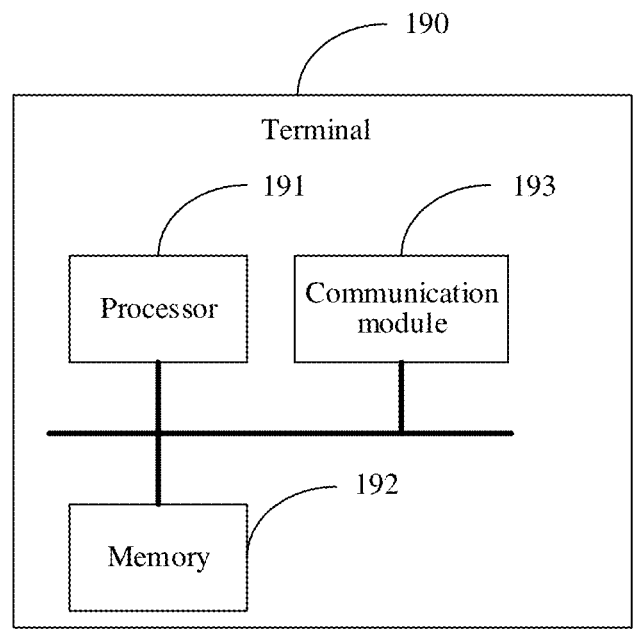
FIG. 19 is a schematic structural diagram of a terminal according to an embodiment of the present disclosure.

Refer to FIG. 19. FIG. 19 is a schematic structural diagram of a terminal according to an embodiment of the present disclosure.

As shown in FIG. 19, the terminal 190 includes a processor 191, a memory 192 and a communication module 193. Any two of the processor 191, the memory 192 and the communication module 193 are communicatively connected through a bus.

The processor 191 may be any type of processor that has one or more processing cores, which can perform single-threaded or multi-threaded operations and is configured to analyze instructions to perform operations such as obtaining data, performing logical operation functions, and delivering operation processing results.

The processor 191 is configured to send a first route task instruction to a first nest, to enable the first nest to forward the first route task instruction to a first unmanned aerial vehicle corresponding to the first nest, where the first route task instruction is used for controlling the first unmanned aerial vehicle to execute a first route task in a direction of a second nest; obtain distance information between the first unmanned aerial vehicle and the second nest in real time, and sending a vehicle moving instruction to the second nest if the distance information is less than a preset distance, where the vehicle moving instruction is used for controlling a second unmanned aerial vehicle corresponding to the second nest to leave the second nest; and send a landing instruction to the first unmanned aerial vehicle, to control the first unmanned aerial vehicle to land in the second nest. The first nest and the second vehicle nest are arranged, and the terminal sends an instruction to a nest to control remote take-off and landing of an unmanned aerial vehicle, which can better achieve remote take-off and landing of the unmanned aerial vehicle.

The memory 192, as a non-transitory computer-readable storage medium, may be configured to store a non-transitory software program, a non-transitory computer executable program and a module, such as a program instruction/module corresponding to the unmanned aerial vehicle remote take-off and landing method in the embodiments of the present disclosure. The processor 191 runs the non-transitory software program, the instructions and the module stored in the memory 192, to implement the unmanned aerial vehicle remote take-off and landing method in the foregoing method embodiments.

The memory 192 may include a program storage area and a data storage area. The program storage area may store an operating system and an disclosure program that is required for at least one function. The storage data area may store data and the like created according to use of a remote control apparatus. In addition, the memory 192 may include a high-speed random access memory, and may further include a non-transitory memory, such as at least one magnetic disk memory device, a flash memory device, or other non-transitory solid-state memory devices. In some embodiments, the memory 192 may further optionally include memories remotely disposed relative to the processor 191, and the remote memories may be connected to the terminal through a network. Examples of the network include, but are not limited to, the Internet, an intranet, a local area network, a mobile communication network and a combination thereof.

The memory 192 stores instructions executable by the at least one processor 191; and the at least one processor 191 is configured to execute the instructions, to implement the unmanned aerial vehicle remote take-off and landing method in the foregoing method embodiments.

The communication module 193 is a functional module configured to establish a communication connection and provide a physical channel. The communication module 193 may be any type of wireless or wired communication module, which includes, but not limited to, a Wi-Fi module or a Bluetooth module.

Further, an embodiment of the present disclosure further provides a non-transitory computer-readable storage medium. The non-transitory computer-readable storage medium stores computer-executable instructions, and the computer-executable instructions are executed by one or more processors 191, to enable the one or more processors 191 to perform the unmanned aerial vehicle remote take-off and landing method in any method embodiment above.

Figure 20:
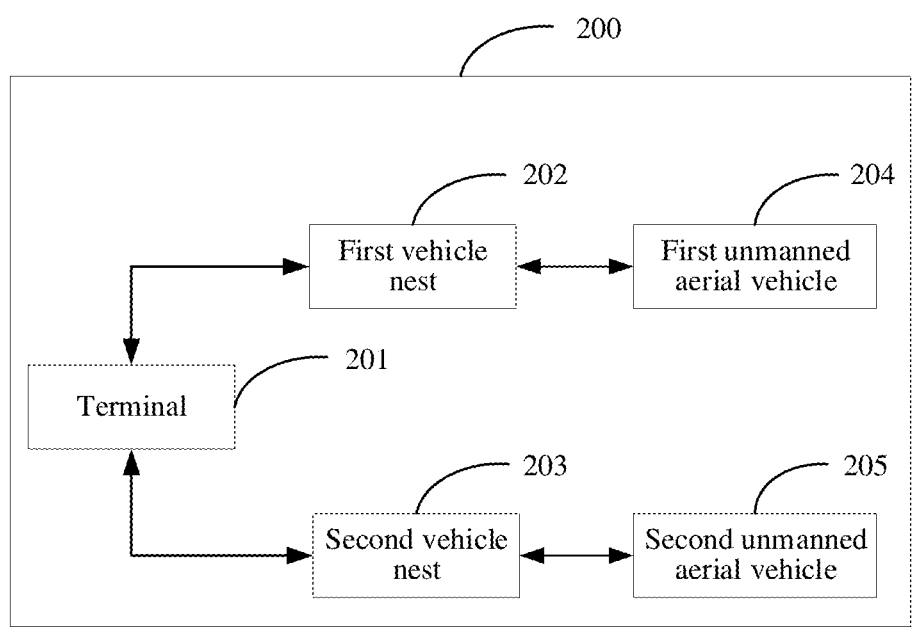
FIG. 20 is a schematic structural diagram of an unmanned aerial vehicle remote take-off and landing system according to an embodiment of the present disclosure.

Refer to FIG. 20. FIG. 20 is a schematic structural diagram of an unmanned aerial vehicle remote take-off and landing system according to an embodiment of the present disclosure.

As shown in FIG. 20, the unmanned aerial vehicle remote take-off and landing system 200 includes a terminal 201, a first nest 202, a second nest 203, a first unmanned aerial vehicle 204 and a second unmanned aerial vehicle 205.

Both the first nest 202 and the second nest 203 in this embodiment of the present disclosure are connected to the terminal 201 through a wireless communication network, and control on the first nest 202 and the second nest 203 are achieved through the terminal 201, to further achieve control on the first unmanned aerial vehicle 204 and the second unmanned aerial vehicle 205.

In this embodiment of the present disclosure, the terminal 201 is connected to the first nest 202 and the second nest 203 through wireless communication. The terminal 201 may include but is not limited to a mobile phone, a tablet computer, a controller or a device that is configured to display an image.

For related content of the first unmanned aerial vehicle 204 and the second unmanned aerial vehicle 205 of the unmanned aerial vehicle remote take-off and landing system 200 in this embodiment of the present disclosure, reference may be made to the unmanned aerial vehicle mentioned in the foregoing embodiments. Details are not described herein again.

The first nest 202 and the second nest 203 in this embodiment of the present disclosure are unmanned aerial nests for performing take-off and landing by the unmanned aerial vehicle. Both the first nest 202 and the second nest 203 include related components such as a centering rod, a battery group and a cabin door.

Further, an embodiment of the present disclosure further provides a non-transitory computer-readable storage medium. The non-transitory computer-readable storage medium stores computer-executable instructions, and the computer-executable instructions are executed by one or more processors, to enable the one or more processors to perform the unmanned aerial vehicle remote take-off and landing method in any method embodiment above.

Further, an embodiment of the present disclosure further provides a computer program product. The computer program product includes a non-transitory computer-readable storage medium storing a computer program, and the computer program is operable to enable a computer to perform some or all steps of the unmanned aerial vehicle remote take-off and landing method described in any method embodiment. The computer program product may be a software installation package.

The described apparatus embodiment is merely an example. The units described as separate parts may or may not be physically separate, and parts displayed as units may or may not be physical units, may be located in one position, or may be distributed on a plurality of network units. Some or all of the modules may be selected according to actual requirements to implement the objectives of the solutions of the embodiments. Some or all of the modules may be selected according to actual needs to implement the objectives of the solutions of the embodiments.

Based on the descriptions of the foregoing implementations, a person of ordinary skill in the art may clearly understand that the implementations may be implemented by software in addition to a universal hardware platform, or by hardware. A person of ordinary skill in the art may understand that all or some of procedures in the foregoing embodiment methods may be implemented by a computer program in a computer program product instructing relevant hardware. The computer program may be stored in a non-transitory computer-readable storage medium, and the computer program includes program instructions. When the program instructions are executed by a related device, the related device may be enabled to execute the procedures of the foregoing method embodiments. The foregoing storage medium may be a magnetic disk, an optical disc, a read-only memory (ROM), a random access memory (RAM), or the like.

The foregoing product may perform the unmanned aerial vehicle remote take-off and landing method provided in the embodiments of the present disclosure, and have the corresponding functional modules for performing the unmanned aerial vehicle remote take-off and landing method and beneficial effects thereof. For technical details not illustrated in this embodiment of the present disclosure, refer to the unmanned aerial vehicle remote take-off and landing method provided in the embodiments of the present disclosure.

Beneficial effects of the embodiments of the present disclosure are as follows: Different from the related art, the unmanned aerial vehicle remote take-off and landing method provided in the embodiments of the present disclosure is applied to a terminal, the terminal being communicatively connected to at least two nests, each nest corresponding to an unmanned aerial vehicle, and the method includes: sending a first route task instruction to a first nest, to enable the first nest to forward the first route task instruction to a first unmanned aerial vehicle corresponding to the first nest, where the first route task instruction is used for controlling the first unmanned aerial vehicle to execute a first route task in a direction of a second nest; obtaining distance information between the first unmanned aerial vehicle and the second nest in real time, and sending a vehicle moving instruction to the second nest if the distance information is less than a preset distance, where the vehicle moving instruction is used for controlling a second unmanned aerial vehicle corresponding to the second nest to leave the second nest; and sending a landing instruction to the first unmanned aerial vehicle, to control the first unmanned aerial vehicle to land in the second nest.

The first nest and the second nest are arranged, and the terminal sends an instruction to a nest to control remote take-off and landing of an unmanned aerial vehicle, which can better achieve remote take-off and landing of the unmanned aerial vehicle and improve stability of remote take-off and landing of the unmanned aerial vehicle.

Finally, it should be noted that the foregoing embodiments are merely used for describing the technical solutions of the present disclosure, but are not intended to limit the present disclosure. Under the ideas of the present disclosure, the technical features in the foregoing embodiments or different embodiments may also be combined, the steps may be performed in any order, and many other changes of different aspects of the present disclosure also exists as described above. These changes are not provided in detail for simplicity. Although the present disclosure is described in detail with reference to the foregoing embodiments, a person of ordinary skill in the art are to understand that they may still make modifications to the technical solutions described in the foregoing embodiments or make equivalent replacements to some technical features thereof, and these modifications or replacements will not cause the essence of corresponding technical solutions to depart from the scope of the technical solutions in the embodiments of the present disclosure.

What is claimed is:

1. An unmanned aerial vehicle remote take-off and landing method, applied to a terminal, the terminal being communicatively connected to at least two nests, each nest corresponding to the unmanned aerial vehicle, and the method comprising:
   sending a first route task instruction to a first nest, so that the first nest to forward the first route task instruction to a first unmanned aerial vehicle corresponding to the first nest, wherein the first route task instruction is configured to control the first unmanned aerial vehicle to perform the first route task in a direction of a second nest;
   obtaining distance information between the first unmanned aerial vehicle and the second nest in real time, and sending a vehicle moving instruction to the second nest when the distance information is less than a preset distance, wherein the vehicle moving instruction is configured to control a second unmanned aerial vehicle corresponding to the second nest to leave the second nest; and
   sending a landing instruction to the first unmanned aerial vehicle, to control the first unmanned aerial vehicle to land in the second nest.

2. The method according to claim 1, further comprising:
   determining, before sending the first route task instruction to the first nest, whether the second nest meets a landing condition, wherein the landing condition comprises that the second nest normally works, the second nest meets a battery replacement condition and weather of a landing point of the second nest meets a task execution condition;
   sending the first route task instruction to the first nest when the second nest meets the landing condition; and
   skipping sending the first route task instruction to the first nest when the second nest does not meet the landing condition, to cancel the first route task.

3. The method according to claim 2, further comprising:
   further determining, after determining whether the second nest meets the landing condition, whether a relay base station on a first route corresponding to the first route task meets a communication condition, wherein the communication condition comprises that the relay base station normally works and an endurance time of the relay base station exceeds a preset endurance time threshold;
   sending the first route task instruction to the first nest when the relay base station on the first route corresponding to the first route task meets the communication condition; and
   skipping sending the first route task instruction to the first nest when the relay base station on the first route corresponding to the first route task does not meet the communication condition, to cancel the first route task.

4. The method according to claim 3, wherein a plurality of nests are arranged on the first route corresponding to the first route task, each nest corresponding to at least one alternate landing point, each alternate landing point being in a one-to-one correspondence with a nest number, and the method further comprises:
   sending position information of each alternate landing point to the first unmanned aerial vehicle after the first nest forwards the first route task instruction to the first unmanned aerial vehicle corresponding to the first nest, wherein the alternate landing point is arranged within a preset range of each of the nests.

5. The method according to claim 4, further comprising:
   when the first unmanned aerial vehicle is in a task execution state, detecting that the second nest does not meet the landing condition and determining whether a control instruction is received within a preset time;
   controlling, when the control instruction is received within the preset time, the first unmanned aerial vehicle to execute the control instruction, wherein the control instruction is used for controlling the first unmanned aerial vehicle to perform alternate landing; and
   controlling, when the control instruction is not received within the preset time, the first unmanned aerial vehicle to land at a nearest forced landing point of a current position of the first unmanned aerial vehicle.

6. The method according to claim 1, further comprising:
   controlling, after sending the vehicle moving instruction to the second nest, the second unmanned aerial vehicle to fly to an alternate landing point corresponding to the second nest, wherein the alternate landing point is arranged within a preset range of the second nest;
   determining that vehicle movement is successful when the second unmanned aerial vehicle lands at the alternate landing point corresponding to the second nest and the first unmanned aerial vehicle lands at a landing point corresponding to the second nest, wherein the landing point corresponding to the second nest comprises a parking apron of the second nest; and
   determining that vehicle movement is unsuccessful when the second unmanned aerial vehicle does not land at the alternate landing point corresponding to the second nest and/or the first unmanned aerial vehicle does not land at the landing point corresponding to the second nest.

7. The method according to claim 1, wherein the first nest corresponds to a first network segment, the first network segment corresponding to a first key, and the second nest corresponds to a second network segment, the second network segment corresponding to a second key; and the method further comprises:
   after the first unmanned aerial vehicle lands in the second nest, modifying a network segment corresponding to the second nest to the first network segment and modifying a key corresponding to the second nest to a key of the first unmanned aerial vehicle, to enable the second nest to establish an image transmission connection to the first unmanned aerial vehicle.

8. The method according to claim 7, further comprising:
   sending a second route task instruction to the second nest after the second nest establishes the image transmission connection to the first unmanned aerial vehicle, wherein the second route task instruction is configured to control the first unmanned aerial vehicle to perform a second route task in a direction of the first nest;
   obtaining battery level information of the first unmanned aerial vehicle after the second nest receives the second route task instruction; and
   controlling, when the battery level information of the unmanned aerial vehicle is less than a preset battery level threshold, the second nest to replace a battery of the first unmanned aerial vehicle.

9. The method according to claim 8, further comprising:
sending a first returning instruction to the second nest after the second nest replaces the battery of the first unmanned aerial vehicle, to enable the second nest to forward the first returning instruction to the first unmanned aerial vehicle, wherein the first returning instruction is configured to control the first unmanned aerial vehicle to return from the second nest to the first nest.

10. The method according to claim 9, further comprising:
determining, before sending the first returning instruction to the second nest, whether the first nest meets a landing condition, wherein the landing condition comprises that the first nest normally works and weather of a landing point of the second nest meets a task execution condition; and
when the first nest meets the landing condition, disconnecting the image transmission connection between the second nest and the first unmanned aerial vehicle and establishing an image transmission connection between the first nest and the first unmanned aerial vehicle.

11. The method according to claim 10, further comprising:
when the first nest successfully establishes the image transmission connection to the first unmanned aerial vehicle, controlling the second nest to establish an image transmission connection to the second unmanned aerial vehicle and sending the first returning instruction to the second nest, to enable the second nest to forward the first returning instruction to the first unmanned aerial vehicle.

12. An unmanned aerial vehicle remote take-off and landing method, comprising:
sending, by a terminal, a first route task instruction to a first nest;
forwarding, by the first nest after receiving the first route task instruction, the first route task instruction to a first unmanned aerial vehicle corresponding to the first nest, wherein the first route task instruction is configured to control the first unmanned aerial vehicle to perform a first route task in a direction of a second nest;
obtaining, by the terminal, distance information between the first unmanned aerial vehicle and the second nest in real time, and sending a vehicle moving instruction to the second nest when the distance information is less than a preset distance;
controlling, by the second nest after receiving the vehicle moving instruction, a second unmanned aerial vehicle corresponding to the second nest to leave the second nest; and
sending, by the terminal, a landing instruction to the first unmanned aerial vehicle, to control the first unmanned aerial vehicle to land in the second nest.

13. A terminal, comprising:
at least one processor; and
a memory communicatively connected to the at least one processor, wherein the memory stores instructions executable by the at least one processor, the instructions, when executed by the at least one processor, enabling the at least one processor to perform the unmanned aerial vehicle remote take-off and landing method, the unmanned aerial vehicle remote take-off and landing method comprising:
the terminal being communicatively connected to at least two nests, each nest corresponding to the unmanned aerial vehicle, and the method comprising:
sending a first route task instruction to a first nest, so that the first nest to forward the first route task instruction to a first unmanned aerial vehicle corresponding to the first nest, wherein the first route task instruction is configured to control the first unmanned aerial vehicle to perform the first route task in a direction of a second nest;
obtaining distance information between the first unmanned aerial vehicle and the second nest in real time, and sending a vehicle moving instruction to the second nest when the distance information is less than a preset distance, wherein the vehicle moving instruction is configured to control a second unmanned aerial vehicle corresponding to the second nest to leave the second nest; and
sending a landing instruction to the first unmanned aerial vehicle, to control the first unmanned aerial vehicle to land in the second nest.

14. The terminal according to claim 13, further comprising:
determining, before sending the first route task instruction to the first nest, whether the second nest meets a landing condition, wherein the landing condition comprises that the second nest normally works, the second nest meets a battery replacement condition and weather of a landing point of the second nest meets a task execution condition;
sending the first route task instruction to the first nest when the second nest meets the landing condition; and
skipping sending the first route task instruction to the first nest when the second nest does not meet the landing condition, to cancel the first route task.

15. The terminal according to claim 14, further comprising:
further determining, after determining whether the second nest meets the landing condition, whether a relay base station on a first route corresponding to the first route task meets a communication condition, wherein the communication condition comprises that the relay base station normally works and an endurance time of the relay base station exceeds a preset endurance time threshold;
sending the first route task instruction to the first nest when the relay base station on the first route corresponding to the first route task meets the communication condition; and
skipping sending the first route task instruction to the first nest when the relay base station on the first route corresponding to the first route task does not meet the communication condition, to cancel the first route task.

16. The terminal according to claim 15, wherein a plurality of nests are arranged on the first route corresponding to the first route task, each nest corresponding to at least one alternate landing point, each alternate landing point being in a one-to-one correspondence with a nest number, and the method further comprises:
sending position information of each alternate landing point to the first unmanned aerial vehicle after the first nest forwards the first route task instruction to the first unmanned aerial vehicle corresponding to the first nest, wherein the alternate landing point is arranged within a preset range of each of the nests.

17. An unmanned aerial vehicle remote take-off and landing system, comprising:

at least two unmanned aerial vehicles;

at least two nests; and a terminal, communicatively connected to the at least two nests, the terminal further comprises:

at least one processor; and a memory communicatively connected to the at least one processor, wherein the memory stores instructions executable by the at least one processor, the instructions, when executed by the at least one processor, enabling the at least one processor to perform the unmanned aerial vehicle remote take-off and landing method, the unmanned aerial vehicle remote take-off and landing method comprising:

the terminal being communicatively connected to at least two nests, each nest corresponding to the unmanned aerial vehicle, and the method comprising:

sending a first route task instruction to a first nest, so that the first nest to forward the first route task instruction to a first unmanned aerial vehicle corresponding to the first nest, wherein the first route task instruction is configured to control the first unmanned aerial vehicle to perform the first route task in a direction of a second nest;

obtaining distance information between the first unmanned aerial vehicle and the second nest in real time, and sending a vehicle moving instruction to the second nest when the distance information is less than a preset distance, wherein the vehicle moving instruction is configured to control a second unmanned aerial vehicle corresponding to the second nest to leave the second nest; and sending a landing instruction to the first unmanned aerial vehicle, to control the first unmanned aerial vehicle to land in the second nest.

18. The unmanned aerial vehicle remote take-off and landing system according to claim 17, further comprising:

determining, before sending the first route task instruction to the first nest, whether the second nest meets a landing condition, wherein the landing condition comprises that the second nest normally works, the second nest meets a battery replacement condition and weather of a landing point of the second nest meets a task execution condition;

sending the first route task instruction to the first nest when the second nest meets the landing condition; and skipping sending the first route task instruction to the first nest when the second nest does not meet the landing condition, to cancel the first route task.

19. The unmanned aerial vehicle remote take-off and landing system according to claim 18, further comprising:

further determining, after determining whether the second nest meets the landing condition, whether a relay base station on a first route corresponding to the first route task meets a communication condition, wherein the communication condition comprises that the relay base station normally works and an endurance time of the relay base station exceeds a preset endurance time threshold;

sending the first route task instruction to the first nest when the relay base station on the first route corresponding to the first route task meets the communication condition; and skipping sending the first route task instruction to the first nest when the relay base station on the first route corresponding to the first route task does not meet the communication condition, to cancel the first route task.

20. The unmanned aerial vehicle remote take-off and landing system according to claim 19, wherein a plurality of nests are arranged on the first route corresponding to the first route task, each nest corresponding to at least one alternate landing point, each alternate landing point being in a one-to-one correspondence with a nest number, and the method further comprises:

sending position information of each alternate landing point to the first unmanned aerial vehicle after the first nest forwards the first route task instruction to the first unmanned aerial vehicle corresponding to the first nest, wherein the alternate landing point is arranged within a preset range of each of the nests.

\* \* \* \* \*